US012768804B2

(12) United States Patent
Klochkov et al.

(10) Patent No.: US 12,768,804 B2
(45) Date of Patent: Oct. 20, 2026

(54) METHOD OF 3D VOLUME INSPECTION OF SEMICONDUCTOR WAFERS WITH INCREASED THROUGHPUT

(71) Applicant: Carl Zeiss SMT GmbH, Oberkochen (DE)

(72) Inventors: Dmitry Klochkov, Schwäbisch Gmünd (DE); Jens Timo Neumann, Aalen (DE); Thomas Korb, Schwäbisch Gmünd (DE); Eugen Foca, Ellwangen (DE); Amir Avishai, Pleasanton, CA (US); Alex Buxbaum, San Ramon, CA (US)

(73) Assignee: Carl Zeiss SMT GmbH, Oberkochen (DE)

( * ) Notice: Subject to any disclaimer, the term of this patent is extended or adjusted under 35 U.S.C. 154(b) by 203 days.

(21) Appl. No.: 18/739,964

(22) Filed: Jun. 11, 2024

(65) Prior Publication Data

US 2024/0328970 A1 Oct. 3, 2024

Related U.S. Application Data

(63) Continuation of application No. PCT/EP2022/085173, filed on Dec. 9, 2022.

(Continued)

(51) Int. Cl.
*G01N 23/2206* (2018.01)

(52) U.S. Cl.
CPC ................................ *G01N 23/2206* (2013.01)

(58) Field of Classification Search
CPC ............ G01N 23/2206; G01N 23/225; G01N 2223/6116; G01N 2223/6462; G03F 7/70616; G03F 7/706839; H01J 2237/221; H01J 2237/226; H01J 2237/24592; H01J 37/222; H10P 74/203

(Continued)

(56) References Cited

U.S. PATENT DOCUMENTS

| | | | | |
|---|---|---|---|---|
| 2013/0279752 | A1* | 10/2013 | Thomas | G06V 20/693 382/103 |
| 2015/0243477 | A1 | 8/2015 | Stone et al. | |
| 2015/0348751 | A1* | 12/2015 | Brogden | H01J 37/3023 250/307 |

FOREIGN PATENT DOCUMENTS

| | | | |
|---|---|---|---|
| CN | 112683929 | A | 4/2021 |
| TW | 201945691 | A | 12/2019 |

(Continued)

OTHER PUBLICATIONS

International Search Report and Written Opinion for corresponding PCT Appl No. PCT/EP2022/085173, dated Mar. 29, 2023.

(Continued)

*Primary Examiner* — Kiet T Nguyen
(74) *Attorney, Agent, or Firm* — Fish & Richardson P.C.

(57) ABSTRACT

A system and a method for volume inspection of semiconductor wafers with increased throughput are configured for milling and imaging a reduced number or areas of appropriate cross-sections surfaces in an inspection volume and determining inspection parameters of the 3D objects from the cross-section surface images. The method and device can be utilized for quantitative metrology, defect detection, process monitoring, defect review, and inspection of integrated circuits within semiconductor wafers.

20 Claims, 17 Drawing Sheets

Related U.S. Application Data

(60) Provisional application No. 63/291,569, filed on Dec. 20, 2021.

(58) Field of Classification Search
USPC .......................................................... 250/307
See application file for complete search history.

(56) References Cited

FOREIGN PATENT DOCUMENTS

| | | | |
|---|---|---|---|
| TW | 202138927 | A | 10/2021 |
| WO | WO 2020/244795 | A1 | 12/2020 |
| WO | WO 2021/083581 | A1 | 5/2021 |
| WO | WO 2021/180600 | A1 | 9/2021 |

OTHER PUBLICATIONS

Taiwanese Office Action and Search Report, with translation thereof, for corresponding TW Appl No. 111143896, dated Jul. 28, 2023.

Office Action in Korean Appln. No. 10-2024-7024475, mailed on Apr. 29, 2026, 5 pages (with English translation).

* cited by examiner

METHOD OF 3D VOLUME INSPECTION OF SEMICONDUCTOR WAFERS WITH INCREASED THROUGHPUT

CROSS-REFERENCE TO RELATED APPLICATIONS

The present application is a continuation of, and claims benefit under 35 USC 120 to, international application No. PCT/EP2022/085173, filed Dec. 9, 2022, which claims benefit under 35 USC § 119(e) of U.S. Provisional Application No. 63/291,569, filed Dec. 20, 2021. The entire disclosure of each of these applications is incorporated by reference herein.

FIELD

The present disclosure relates to a three-dimensional circuit pattern inspection method of an inspection volume at an inspection site of a semiconductor wafer and related technology, such as, a method, computer program product and a corresponding semiconductor inspection device for determining parameters of 3D objects such as high aspect ratio (HAR) structures in an inspection volume of a semiconductor wafer with increased throughput. The method can employ a milling and imaging of reduced number or area of appropriate cross-sections surfaces in an inspection volume and determining inspection parameters of the 3D objects from the cross-section surface images and a priori information. The method, computer program product and device can be utilized for quantitative metrology, defect detection, process monitoring, defect review, and inspection of integrated circuits within semiconductor wafers.

BACKGROUND

Semiconductor structures are amongst the finest human-made structures and suffer from different imperfections. Devices for quantitative 3D-metrology, defect-detection or defect review are looking for these imperfections. Fabricated semiconductor structures are often based on prior knowledge. The semiconductor structures are manufactured from a sequence of layers being parallel to a substrate. For example, in a logic type sample, metal lines are running parallel in metal layers or HAR structures and metal vias run perpendicular to the metal layers. The angle between metal lines in different layers is generally either 0° or 90°. On the other hand, for VNAND type structures it is known that their cross-sections are circular on average.

A semiconductor wafer can have a diameter of 300 mm and include a plurality of several sites, so called dies, each comprising at least one integrated circuit pattern such as for example for a memory chip or for a processor chip. During fabrication, semiconductor wafers run through about 1000 process steps, and within the semiconductor wafer, about 100 and more parallel layers are formed, comprising the transistor layers, the layers of the middle of the line, and the interconnect layers and, in memory devices, a plurality of 3D arrays of memory cells. Dimensions, shapes and placements of the semiconductor structures and patters are subject to several influences. In manufacturing of 3D-Memory devices, process steps currently include etching and deposition. Other process steps such as the lithography exposure or implantation can have an impact on the properties of the IC-elements.

In general, the aspect ratio and the number of layers of integrated circuits is constantly increasing and the structures are growing into the third (vertical) dimension. The current height of the memory stacks exceeds a dozen of microns. In contrast, the features size is becoming smaller. The minimum feature size or critical dimension (CD) is below 10 nanometers (nm), for example 7 nm or 5 nm, and is approaching feature sizes below 3 nm in near future. While the complexity and dimensions of the semiconductor structures are growing into the third dimension, the lateral dimensions of integrated semiconductor structures are becoming smaller. Therefore, measuring the shape, dimensions and orientation of the features and patterns in 3D and their overlay with high precision can become challenging.

With a desire for increased resolution of charged particle imaging systems in three dimensions, the inspection and 3D analysis of integrated semiconductor circuits in wafers can become more and more challenging. The lateral measurement resolution of charged particle systems is typically limited by the sampling raster of individual image points or dwell times per pixel on the sample, and the charged particle beam diameter. The sampling raster resolution can be set within the imaging system and can be adapted to the charged particle beam diameter on the sample. The typical raster resolution is 2 nm or below, but the raster resolution limit can be reduced with no physical limitation. The charged particle beam diameter has a limited dimension, which generally depends on the charged particle beam operation conditions and lens. The beam resolution is generally limited by approximately half of the beam diameter. The resolution can be below 2 nm, for example even below 1 nm.

A common way to generate 3D tomographic data from semiconductor samples on the nanometer scale is the so-called slice and image approach elaborated for example by a dual beam device. A slice and image approach is described in WO 2020/244795A1.

According to the method of the WO 2020/244795A1, a 3D volume inspection is obtained at an inspection sample extracted from a semiconductor wafer. In this method, a wafer is destroyed to obtain an inspection sample of block shape. Utilizing the slice and image method under a slanted angle into the surface of a semiconductor wafer, as described in WO 2021/180600A1, can avoid wafer destruction. According to this method, a 3D volume image of an inspection volume is obtained by slicing and imaging a plurality of cross-section surfaces of the inspection volume. In a first example for a precise measurement, a large number N of cross-section surfaces of the inspection volume is generated, with the number N exceeding 100 or even more image slices. For example, in a volume with a lateral dimension of 5 micrometers (μm) and a slicing distance of 5 nm, 1000 slices are milled and imaged. This method is very time consuming and can involve several hours for one inspection site.

According to several inspection tasks, it is not required to obtain a full 3D volume image. A task of the inspection is to determine a set of specific parameters of semiconductor objects such as HAR structures—structures inside the inspection volume. For the determination of the set of specific parameters, the number of image slices through a volume can be reduced. WO 2021/180600A1 illustrates some methods which utilize a reduced number of images slices. In an example, the method applies a priori information. From a single cross-section surface and a 3D volume image of a previous determination step, a property an HAR structure is derived.

It has been observed that the methods of WO 2021/180600A1, however, in many cases may not provide sufficient information for the determination of a set of parameters of semiconductor structures. It has been observed that in some examples the methods according to WO 2021/180600A1 can generate measurement artefacts. According to recent developments, properties for the determination of the set of parameters are further increased. In an example, a memory circuitry comprises several stacks of HAR structures. According to a recent development, a semiconductor wafer comprises several different groups of semiconductor features.

SUMMARY

The disclosure seeks to provide improved methods utilizing a relatively reduced number of cross-section images slices. Generally, the disclosure seeks to provide a wafer inspection method for the inspection of semiconductor structures in inspection volumes with high throughput and higher accuracy. The disclosure also seeks to provide a fast and reliable measurement method of a set of parameters describing semiconductor structures in an inspection volume with high precision and with reduced measurement artefacts. Further, the disclosure seeks to provide a method for the determination of a stack overlay error. In addition, the disclosure seeks to provide a method for the determination of a wiggling of HAR structures of a specific, higher frequency. The disclosure also seeks to provide a method for the determination of a set of parameters for each of different groups of semiconductor features. The disclosure further seeks to reduce the damage of a wafer during a monitoring task in a high-volume manufacturing process.

According to the disclosure, a system and a method for volume inspection of semiconductor wafers with increased throughput is provided. The system and method are configured for milling and imaging a reduced number or area of appropriate cross-sections surfaces in an inspection volume and determining inspection parameters of the 3D objects from the cross-section surface images. The disclosure provides a device and a method for 3D inspection of an inspection volume in a wafer and for the determination of a set of parameters of semiconductor features inside of the inspection volume with relatively high throughput, relatively high accuracy and relatively reduced damage to the wafer. The method and device can be utilized for quantitative metrology, defect detection, process monitoring, defect review, and inspection of integrated circuits within semiconductor wafers.

In an embodiment of the disclosure, a method for determining a first set of L parameters describing a first group of repetitive three-dimensional structures is given. The first group of repetitive three-dimensional structures can for example be given by a first plurality of HAR structures of a memory device. The parameters of the first group of repetitive three-dimensional structures are determined inside of a predetermined inspection volume of a semiconductor wafer.

The method comprises the step of obtaining a series of J cross-section image slices, comprising at least a first cross-section image slice at a first angle and a second cross-section image slice at a second angle through the inspection volume. The first and second angle can be equal or different. Typically, the number J of cross-section image slices is J<20, such as J<10, for example J<=3, for example J=2. Thereby, a high throughput is achieved.

The method further comprises the step of determining at least a first set of N measured cross-section values v1 . . . vN of the first group of repetitive three-dimensional structures from the series of J cross-section image slices at different z-positions within the inspection volume.

The cross-section values v1 . . . vN can be at least one member of the group of an edge position, a center position, a radius, a diameter, an eccentricity, an orientation or a cross-section area of the first group of repetitive three-dimensional structures inside of an inspection volume.

The method comprises the step of determining the first set of L parameters P1, . . . PL by least square optimization of a first parameter model V(z; P1 . . . PL) to the first set of measured cross-section values v1 . . . vN and a plurality of initial reference values Vref(i=1 . . . M). The set of parameters P1, . . . PL describe at least one member of the group of a tilt, a curvature, an oscillation frequency, a oscillation amplitude, a power amplitude of an average three-dimensional structure of the first group of repetitive three-dimensional structures inside of an inspection volume.

The method further comprises the step of determining the plurality of initial reference values Vref(i=1 . . . M) of the first group of repetitive three-dimensional structures within a first reference plane.

In an example, the step of determining at least a first set of measured cross-section values v1 . . . vN comprises the determination of the depth or z-position of each of the first set of measured cross-section values v1 . . . vN. Thereby, a full 3D inspection and measurement is achieved. For example, the depth determination is performed at second features of known depth inside of the inspection volume of a semiconductor wafer.

In an example, the step (a) of obtaining a series of J cross-section image slices comprises the step of determining a sequence of z-positions of the cross-section values v1 . . . vN to be measured and adjusting the number J and the spacing of the series of J cross-section image slices and the first and/or second angle according to the sequence of z-positions of the cross-section values v1 . . . vN. For example, the determining of the sequence of z-positions can be based on a predetermined minimum sampling rate of z-positions for determining the first set of L parameters P1, . . . PL of the first plurality of M (HAR) structures. In addition, the first angle and the second angle can be selected between 150 and 600 with respect to a surface of the semiconductor wafer. The first angle can be different from the second angle by more than 5°, thereby for example a higher sampling of deep structures can be achieved without increasing the inspection volume significantly. The change in the angle can be achieved by the rotation of the FIB scan plane without involving a mechanical rotation of the FIB column or the stage. In an example, the number J and the spacing of the series of J cross-section image slices and the first and/or second angles are adjusted such that in each predetermined interval of z-positions, at least two cross-section values of the first set of measured cross-section values v1 . . . vN are determined. In an example, the series of J cross-section image slices comprises at least a third cross-section image slice at the second angle through the inspection volume, wherein the second angle is larger than the first angle. Thereby, a damage of the wafer can be limited to a small area or volume of the wafer and a larger sampling rate of deep cross-sections is achieved. In an example, the dual beam system comprises a first focused ion beam system arranged at a first angle GF1 and a second focused ion column arranged at the second angle GF2, and the wafer is rotated between milling at the first angle GF1 and the second angle GF2, while imaging is performed by the imaging charged particle beam column.

The method can further comprise the step of determining the predetermined sequence of z-positions or the predetermined sampling rate of z-positions and/or the predetermined reference values from a 3D volume image of a representative inspection volume of a representative wafer. The predetermined positions or reference values can be obtained by slicing and imaging with a plurality of R cross-section image slices with a number of slices R>10×J, such as R>1000. From such a high-resolution 3D volume image, the inspection method of high throughput can be calibrated or trained.

During the step of determining a plurality of initial reference values Vref(i=1 . . . M), the predetermined reference values of the for example first plurality of M High Aspect Ratio (HAR) structures inside of the inspection volume of the semiconductor wafer can be used. The method can further comprise the step of determining a plurality of first confined reference values Vcf(i=1 . . . M) in the first reference plane from the first set of parameters P1, . . . PL and the plurality of initial reference values Vref(i=1 . . . M). In a further step, the accuracy of first set of parameters P1, . . . PL can be improved by least square optimization of a first parameter model V(z; P1 . . . PL) to the first set of measured cross-section values v1 . . . vN and the plurality of first confined reference values Vcf(i=1 . . . M). The iterative method can off course be continued with further confined reference values. By such an iterative approach, the accuracy of the method of 3D volume inspection and the parameter determination with high throughput can be further improved.

In an example, the method can comprise a scaling of a measured cross-section value of the first set of measured cross-section values v1 . . . vN with a predetermined scaling parameter. The predetermined scaling parameters can be obtained from a high-resolution 3D volume image and can compensate adverse effects of the 3D volume inspection method with high throughput and only a limited number of cross-section images. The predetermined scaling parameter can for example by selected according to the angle GF of the cross-section image slice from which the measured cross-section value is obtained. The predetermined scaling parameter can further be selected according to the depth of the measured cross-section value.

In a further example of the method, two different sets of parameters of two different sets of repetitive structures inside an inspection volume of a wafer are determined. According to the method, a plurality of cross-section image features of a plurality three-dimensional structures in the series of J cross-section image slices is determined and a grouping the plurality of cross-section image features in first cross-section image features of the first group of repetitive three-dimensional structures and second cross-section image features of the second group of repetitive three-dimensional structures is performed. The method comprises the step of determining a second set of L2 parameters describing a second group of repetitive three-dimensional structures. The repetitive three-dimensional structures can be high aspect ratio (HAR) structures of a memory device, forming a first plurality of HAR structures and a second plurality of HAR structures.

The method further comprises the step (b2) of determining at least a second set of measured cross-section values u1 . . . uN2 of the second group of repetitive three-dimensional structures from the series of J cross-section image slices at different z-positions within the inspection volume and the step (c2) of determining a plurality of second initial reference values Uref(i=1 . . . M2) of the second group of repetitive three-dimensional structures within a second reference plane. The method comprises further the step (d2) of determining the second set of K parameters Q1, . . . QK by least square optimization of a second parameter model U(z; Q1 . . . QK) to the second set of measured cross-section values u1 . . . uN2 and the plurality of initial reference values Uref(i=1 . . . M). The method can further comprise an iterative improvement described above, with the step (e2) of determining a plurality of second confined reference values Ucf(i=1 . . . M2) in the second reference plane from the second set of parameters Q1, . . . QK and the plurality of initial reference values Uref(i=1 . . . M2); and the step (f2) of confining the second set of parameters Q1, . . . QK by least square optimization of a second parameter model U(z; Q1 . . . QK) to the second set of measured cross-section values u1 . . . uN2 and the plurality of confined reference values Ucf(i=1 . . . M2).

According to an example of the method, the first plurality of HAR structures corresponds to a first stack of HAR structures and the second plurality of HAR structures corresponds to a second stack of HAR structures underneath the first stack, and an overlay error between the first and the second stack of HAR structures is determined with high accuracy. In this example, the grouping is performed according to the depth of a cross-section image feature, and from the first set of L parameters P1, . . . PL and the second set of K parameters Q1, . . . QK.

In an example, the first group of repetitive three-dimensional structures corresponds to a first row or column of repetitive three-dimensional structures and the second group of repetitive three-dimensional structures corresponds to a second row or column of repetitive three-dimensional structures, and wherein the grouping is performed according to a lateral position of a cross-section image feature. By the method, a scaling deviation between the first and second group of repetitive three-dimensional structures is determined. The method according to this example further comprises the step of determining a plurality of first confined reference values Vcf(i=1 . . . M) in the first reference plane from the first set of parameters P1, . . . PL and the plurality of initial reference values Vref(i=1 . . . M) and a plurality of second confined reference values Ucf(i=1 . . . M2) in the second reference plane from the second set of parameters Q1, . . . QK and the plurality of initial reference values Uref(i=1 . . . M2). From the plurality of first and second confined reference values Vcf(i=1 . . . M) and Ucf(i=1 . . . M2), a scaling deviation between the first and second group of repetitive three-dimensional structures is determined. The first and the second reference plane can be the same reference plane. The first row or column of repetitive three-dimensional structures can be arranged perpendicular to the second row or column of group of repetitive three-dimensional structures.

According to an embodiment of the disclosure, a slice and imaging method with high throughput to acquire a 3D volume image of a deep inspection volume at a depth D within a semiconductor wafer is given. The method comprises the steps forming a first milled reference surface at a first angle GF1 adjacent to the deep inspection volume and obtaining a series of second cross-section image slices through the deep inspection volume at a second angle GF2>GF1, such that the series of a cross-section image slices is intersecting the first milled reference surface. From the series of a cross-section image slices, parameters of a plurality of HAR structures in the deep inspection volume are determined. The method benefits from a reduced amount of milling and imaging of the series of smaller cross-section image slices at a larger depth inside an inspection volume.

In an example, the deep inspection volume comprises a transition from a first stack of HAR structures to a second stack of HAR structures, and at least one determined parameter is an overlay parameter at the interface between the first stack of HAR structures and the second stack of HAR structures. The method can further comprise the steps of determining a first set of N cross-section values v1 . . . vN through the plurality of HAR channels in the first stack in a first reference plane adjacent to the interface, and determining a second set N cross-section values u1 . . . uN through the plurality of HAR channels in the second stack in a second reference plane adjacent to the interface, and the step of computing a difference between the first set of cross-section values v1 . . . vN and the second set of cross-section values u1 . . . uN. The determination of the first or second set of cross-section values v1 . . . vN and u1 . . . uN in the first or second reference planes can be determined according to any of the method steps described above.

Throughout the embodiments, a method of inspection of a group of repetitive three-dimensional structures in a wafer further comprises the steps of determining an inspection position of an inspection volume in the wafer and adjusting the wafer with the inspection position at the cross-section of a dual beam device. The inspection positions can be obtained for an inspection control file or list generated and provided from a further inspection tool or from a list of positions of process control monitors.

In an embodiment of the disclosure, an inspection apparatus for inspection of inspection volumes with high throughput is provided. The inspection apparatus comprises a FIB column arranged and configured for milling a series of cross-sections surfaces at an inspection site into the surface of wafer and a charged particle imaging microscope arranged and configured for acquiring digital images of the series of cross-sections surfaces. The inspection apparatus comprises a stage configured for holding and positioning the inspection site of a wafer and a control unit configured for controlling the operation of milling and imaging the series of cross-sections surfaces. The inspection apparatus further comprises a computing unit configured for determining at least a first set of L parameters describing a first group of repetitive three-dimensional structures inside of an inspection volume of a semiconductor wafer according to any of the methods described above. The computing unit comprises a memory with software installed and a processing unit configured for operating and processing the digital images of the series of cross-sections surfaces according to the software code installed. The computing unit is in communication with an interface for receiving commands and the control unit for receiving the digital image data and for exchanging and providing control commands such as milling angles GF and y-positions of cross-sections through the inspection volume.

The disclosure described by examples and embodiments is not limited to the embodiments and examples but can be implemented by those skilled in the art by various combinations or modifications thereof.

BRIEF DESCRIPTION OF THE DRAWINGS

The present disclosure will be even more fully understood with reference to the following drawings.

DETAILED DESCRIPTION

Throughout the figures and the description, same reference numbers are used to describe same features or components. The coordinate system is selected that the wafer surface 55 coincides with the XY-plane.

Recently, for the investigation of 3D inspection volumes in semiconductor wafers, a slice and imaging method has been proposed, which is applicable to inspection volumes inside a wafer. Thereby, a 3D volume image is generated at an inspection volume inside a wafer in the so called “wedge-cut” approach or wedge-cut geometry, without the need of a removal of a sample from the wafer. The slice and image method is applied to an inspection volume with dimensions of few μm, for example with a lateral extension of 5 μm to 10 μm in wafers with diameters of 200 mm or 300 mm. The lateral extension can also be larger and reach up to few 10ths of micrometers. A V-shaped groove or edge is milled in the top surface of an integrated semiconductor wafer to make accessible a cross-section surface at an angle to the top surface. 3D volume images of inspection volumes are acquired at a limited number of measurement sites, for example representative sites of dies, for example at process control monitors (PCM), or at sites identified by other inspection tools. The slice and image method will destroy the wafer only locally, and other dies may still be used, or the wafer may still be used for further processing. The methods and inspection systems according to the 3D Volume image generation are described in WO 2021/180600A1, which is fully incorporated herein by reference. The current disclosure can provide an improvement and extension to methods and inspection systems according to the 3D Volume image generation, where more than one single wedge-cut slice is acquired. It can provide a generalized method with a unified computational algorithm.

The slice-and-imaging approach for semiconductor devices can take a long time involved to acquire the desired 3D volume image. The total acquisition time includes the site preparation time (deposition of various alignment markers etc.), imaging time (time used to scan the cross-section image slices with the imaging beam), milling time and some other smaller contributions. Many applications involve acquisition of hundreds to thousands slices. In such cases, the imaging and milling times are the dominant contributors.

The proposed disclosure encompasses semiconductor devices including semiconductor-elements with high aspect ratio and/or located in multiple layers inside the device. Manufacturing of such devices can strongly rely on the ability to characterize the semiconductor-elements in 3D. A full-scale 3D Tomography using slice-and-imaging techniques can provide relatively complete information about the investigated semiconductor sample volume. In many cases, however, a manufacturer is only interested in a certain property or certain properties or parameters of a semiconductor structures.

Figure 1:
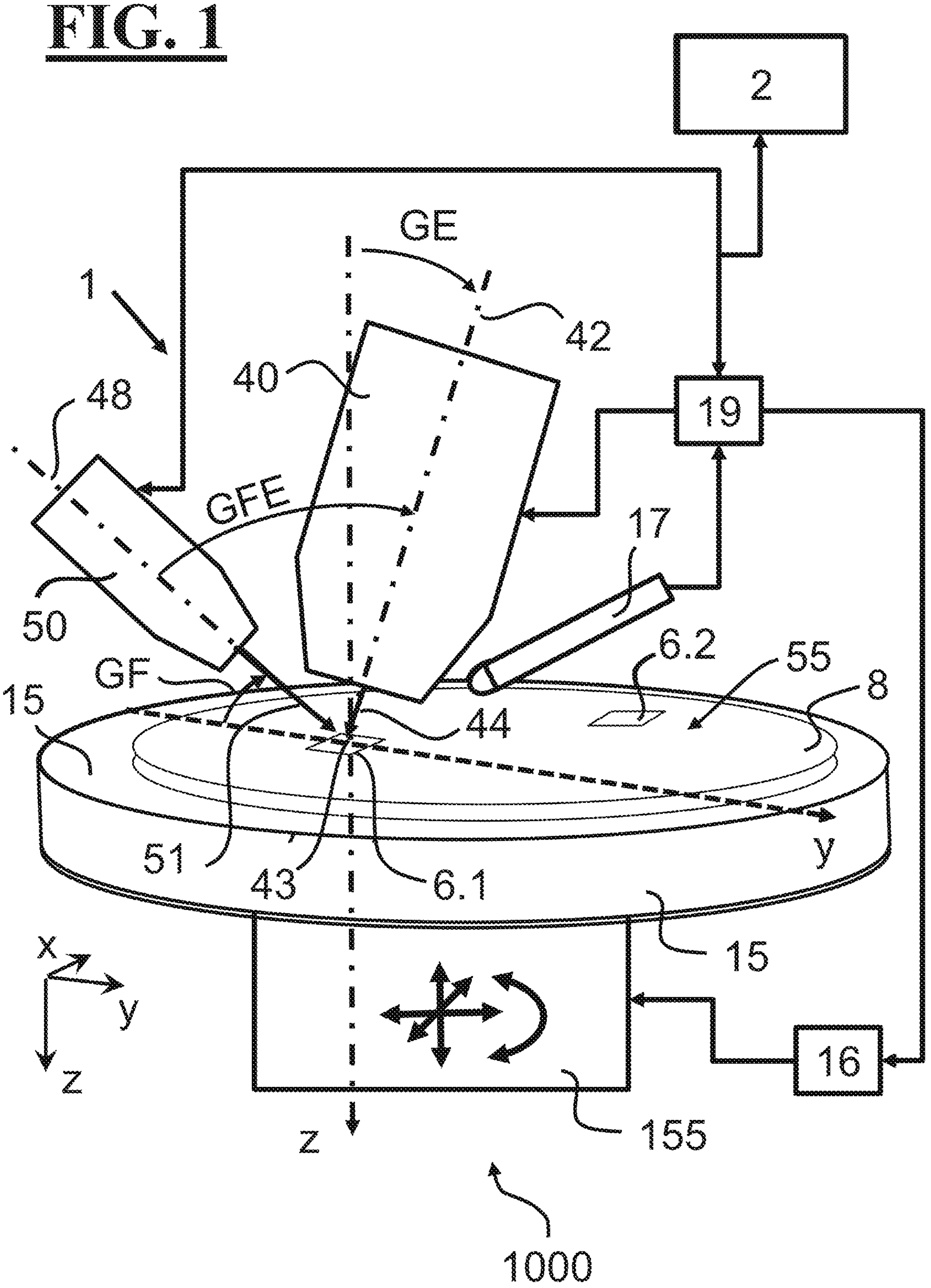
FIG. 1 shows an illustration of a wafer inspection system for 3D volume inspection with a dual beam device.

According to the first embodiment of the disclosure, a wafer inspection system 1000 for 3D volume inspection is given. The wafer inspection system 1000 for 3D volume inspection is illustrated in FIG. 1. The wafer inspection system 1000 is configured for a slice and imaging method under wedge cut geometry with a dual beam device 1. For a wafer 8, several measurement sites, comprising measurement sites 6.1 and 6.2, are defined in a location map or inspection list generated from an inspection tool or from design information. The wafer 8 is placed on a wafer support table 15. The wafer support table 15 is mounted on a stage 155 with actuators and position control. Actuators and mechanisms for precision control for a wafer stage such as Laser interferometers are known in the art. A control unit 16 configured to control the wafer stage 155 and to adjust a measurement site 6.1 of the wafer 8 at the intersection point 43 of the dual-beam device 1.

The dual beam device 1 comprises a FIB column 50 with a FIB optical axis 48 and a charged particle beam (CPB) imaging system 40 with optical axis 42. At the intersection point 43 of both optical axes of FIB and CPB imaging system, the wafer surface is arranged at a slant angle GF to the FIB axis 48. FIB axis 48 and CPB imaging system axis 42 include an angle GFE, and the CPB imaging system axis forms an angle GE with normal to the wafer surface 55. In the coordinate system of FIG. 1, the normal to the wafer surface 55 is given by the z-axis. The focused ion beam (FIB) 51 is generated by the FIB-column 50 and is impinging under angle GF on the surface 55 of the wafer 8. Slanted cross-section surfaces are milled into the wafer by ion beam milling at the inspection site 6.1 under approximately the slant angle GF. In the example of FIG. 1, the slant angle GF is approximately 30°. The actual slant angle of the slanted cross-section surface can deviate from the slant angle GF by up to 1° to 4° due to the beam divergency of the focused ion beam, for example a Gallium-Ion beam. With the charged particle beam imaging system 40, inclined under angle GE to the wafer normal, images of the milled surfaces are acquired. In the example of FIG. 1, the angle GE is about 15°. However, other arrangements are possible as well, for example with GE=GF, such that the CPB imaging system axis 42 is perpendicular to the FIB axis 48, or GE=0°, such that the CPB imaging system axis 42 is perpendicular to the wafer surface 55.

During imaging, a beam of charged particles 44 is scanned by a scanning unit of the charged particle beam imaging system 40 along a scan path over a cross-section surface of the wafer at measurement site 6.1, and secondary particles as well as scattered particles are generated. Particle detector 17 collects at least some of the secondary particles and scattered particles and communicates the particle count with a control unit 19. Other detectors for other kinds of interaction products may be present as well. Control unit 19 is in control of the charged particle beam imaging column 40, of FIB column 50 and connected to a control unit 16 to control the position of the wafer mounted on the wafer support table via the wafer stage 155. Control unit 19 communicates with operation control unit 2, which triggers placement and alignment for example of measurement site 6.1 of the wafer 8 at the intersection point 43 via wafer stage movement and triggers repeatedly operations of FIB milling, image acquisition and stage movements.

Each new intersection surface is milled by the FIB beam 51, and imaged by the charged particle imaging beam 44, which is for example scanning electron beam or a Helium-Ion-beam of a Helium ion microscope (HIM).

In an example, the dual beam system comprises a first focused ion beam system 50 arranged at a first angle GF1 and a second focused ion column arranged at the second angle GF2, and the wafer is rotated between milling at the first angle GF1 and the second angle GF2, while imaging is performed by the imaging charged particle beam column 40, which is for example arranged perpendicular to the wafer surface.

Figure 2:
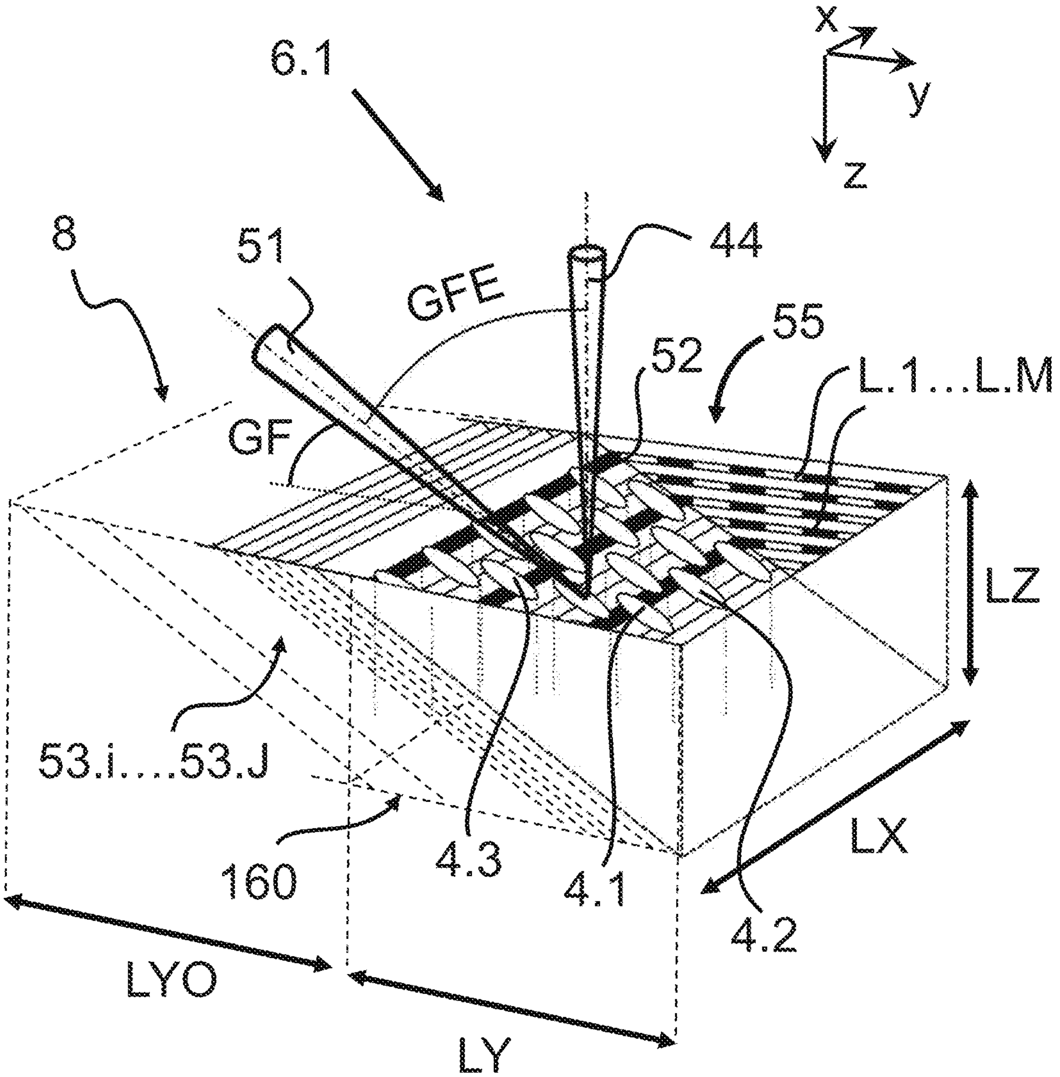
FIG. 2 is an illustration of a method of volume inspection in a wafer with a slanted cross-section milling and imaging by the dial beam device.
Figure 3:
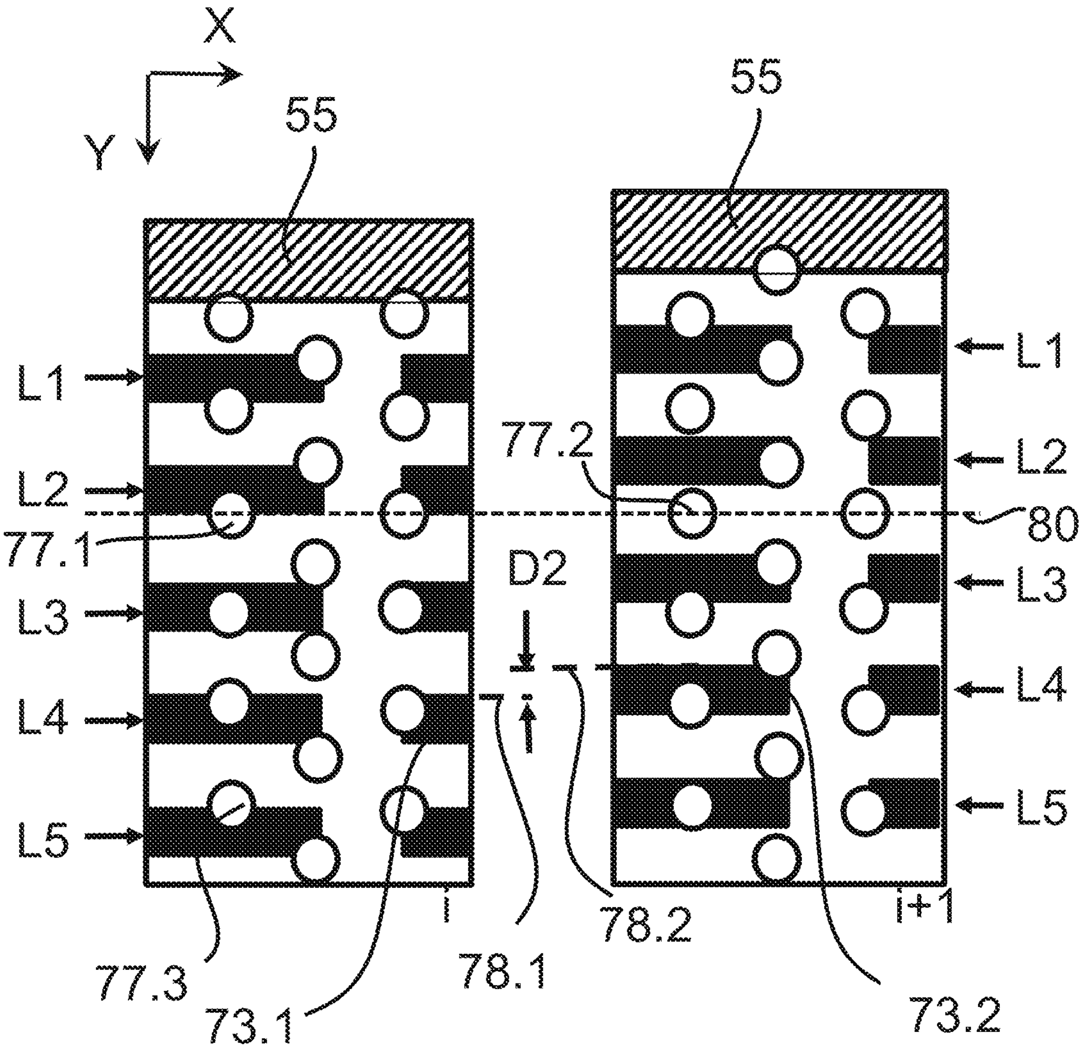
FIG. 3 illustrates two examples of cross-section images slices.

FIG. 2 illustrates further details of the slice and imaging method in the wedge cut geometry. By repetition of the slicing and imaging method in wedge-cut geometry, a plurality of J cross-section image slices comprising image slices of cross-section surfaces 52, 53.*i* . . . 53.J is generated and a 3D volume image of an inspection volume 160 at an inspection site 6.1 of the wafer 8 at measurement site 6.1 is generated. FIG. 2 illustrates the wedge cut geometry at the example of a 3D-memory stack. The cross-section surfaces 52, 53.1 . . . 53.N are milled with a FIB beam 51 at an angle GF of approximately 300 to the wafer surface 9, but other angles GF, for example between GF=20° and GF=60° are possible as well. FIG. 2 illustrates the situation, when the surface 52 is the new cross-section surface which was milled last by FIB 51. The cross-section surface 52 is scanned for example by SEM beam 44, which is in the example of FIG. 2 arranged at normal incidence to the wafer surface 55, and a high-resolution cross-section image slice is generated. The cross-section image slice comprises first cross-section image features, formed by intersections with high aspect ratio (HAR) structures or vias (for example first cross-section image features of HAR-structures 4.1, 4.2, and 4.3) and second cross-section image features formed by intersections with layers L.1 . . . L.M, which comprise for example SiO2, SiN—or Tungsten lines. Some of the lines are also called "word-lines". The maximum number M of layers is typically more than 50, for example more than 100 or even more than 200. The HAR-structures and layers extend throughout most of the volume in the wafer but may comprise gaps. The HAR structures typically have diameters below 100 nm, for example about 80 nm, or for example 40 nm. The cross-section image slices contain therefore first cross-section image features as intersections or cross-sections of the HAR structure footprints at different depth (Z) at the respective XY-location. In case of vertical memory HAR structures of a cylindrical shape, the obtained first cross-sections image features are circular or elliptical structures at various depths determined by the locations of the structures on the sloped cross-section surface 52. The memory stack extends in the Z-direction perpendicular to the wafer surface 55. The thickness d or minimum distances d between two adjacent cross-section image slices is adjusted to values typically in the order of few nm, for example 30 nm, 20 nm, 10 nm, 5 nm, 4 nm or even less. Once a layer of material of predetermined thickness d is removed with FIB, a next cross-section surface 53.*i* . . . 53.J is exposed and accessible for imaging with the charged particle imaging beam 44. FIG. 3 illustrates an ith and (i+1)-th cross-section image slice at an example. The vertical HAR structures appear in the cross-section image slices as first cross-section image features, for example first cross-section image features 77.1, 77.2 and 77.3. Since the imaging charged particle beam 44 is oriented parallel to the HAR structures, the first cross-section image features representing for example an ideal HAR structures would appear at same y-coordinates. For example, first cross-section image features of ideal HAR structures 77.1 and 77.2 are centered at line 80 with identical Y-coordinate of the ith and (i+1)-th image slice. The cross-section image slices further comprise a plurality of second cross-section image features of a plurality of layers comprising for example layers L1 to L5, for example second cross-section image features 73.1 and 73.2 of layer L4. The layer structure appears as segments of stripes along X-direction in the cross-section image slices. The position of these second cross-section image features representing the plurality of layers, here shown layers L1 to L5, however, changes with each cross-section image slice with respect to the first cross-section image features. As the layers intersect the image planes at increasing depth, the position of the second cross-section image features changes from image slice i to image slice i+1 in a predefined manner. The upper surface of layer L4, indicated by reference numbers 78.1, 78.2, are displaced by distance D2 in y-direction. From determining the positions of the second cross-section image features, for example 78.1 and 78.2, the depth map Z(x,y) of a cross-section image can be determined.

By feature extraction of the second cross-section image features, such as edge detection or centroid computation and image analysis, and according to the assumption of the same or similar depth of the second cross-section image features, the determination of the lateral position as well as the relative depth of the first cross-section image features in cross-section image slices is therefore possible with high precision. Due to the planar fabrication techniques involved in the fabrication of a wafer, layers L1 to L5 are at constant depth over a larger area of a wafer. The depth maps of first cross-section image slices can at least be determined relative the depth of second cross-section images features in the M layers. Further details for the generation of the depth maps ZJ(x,y) for the cross-section image slices are described in WO 2021/180600A1.

A plurality of J cross-section image slices acquired in this manner covers an inspection volume of the wafer 8 at measurement site 6.1 and is used for forming of a 3D volume image of high 3D resolution below for example 10 nm, such as below 5 nm. The inspection volume 160 (see FIG. 2) typically has a lateral extension of LX=LY=5 μm to 15 μm in x-y plane, and a depth LZ of 2 μm to 15 μm below the wafer surface 55. The full 3D volume image generation according to WO 2021/180600A1 typically involves the milling of cross-section surfaces into the surface 55 of the wafer 8 with a larger extension in y-direction as the extension LY. In this example, the additional area with extension LYO is destroyed by the milling of the cross-section surfaces 53.1 to 53.N. In a typical example, the extension LYO exceeds 20 μm.

The operation control unit 2 (see FIG. 1) is configured to perform a 3D inspection inside an inspection volume 160 in a wafer 8. The operation control unit 2 is further configured to reconstruct the properties of semiconductor structures of interest from the 3D volume image. In an example, features and 3D positions of the semiconductor structures of interest, for example the positions of the HAR structures, are detected by the image processing methods, for example from HAR centroids. A 3D volume image generation including image processing methods and feature based alignment is further described in WO 2020/244795 A1, which is hereby incorporated by reference.

Figure 4:
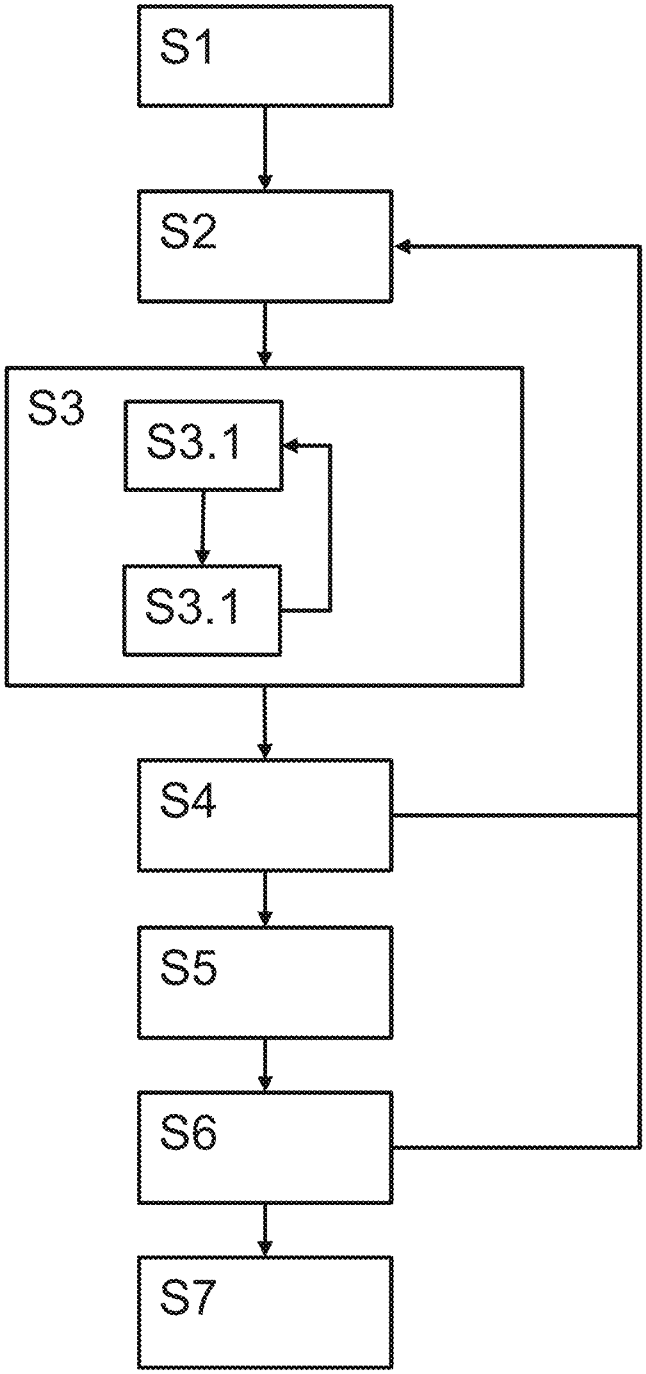
FIG. 4 illustrates an example of the method of inspection of repetitive semiconductor structures inside an inspection volume with high throughput and high accuracy.

According to the aspects provided by the disclosure, the plurality of J cross-section image slices can be reduced to few image slices, for example to a number of cross-section image slices below 10, for example J<4 or J<3. According to the second embodiment, a fast and accurate method of 3D inspection of a group of repetitive, three-dimensional structures in a wafer is given. The method is described in FIG. 4 according to following steps.

In step S1, a wafer is loaded on the wafer support table 15 and the wafer coordinates are registered by methods known in the art. A wafer inspection file is loaded by the operation control unit 2 and at least a first inspection site 6.1 of an inspection task is determined. The first inspection site 6.1 at the wafer surface 15 is positioned under the intersection point 43 of the dual beam device 1.

In step S2, a dimension of the inspection volume 160 and a series of J cross-section images slices through the inspection volume 160 is determined. For each cross-section image slice, a y-coordinate and optionally a milling angle GF is determined. The series of J cross-section images slices comprises at least a first cross-section image slice at a first angle and a second cross-section image slice at a second angle through the inspection volume.

Depending on the inspection task, further variables can be determined in step S2. For example, a specific parameter model for the selected group of repetitive, three-dimensional structures of interest can be determined. For example, the inspection task comprises the inspection of a first and a second group of repetitive, three-dimensional structures of interest.

Optionally, in step S2, alignment marks or fiducials are generated close to the inspection site 6.1 for repeated alignment at the inspection site 6.1.

In step S3, the slice and imaging process is performed and the series of J cross-section images slices through the inspection volume 160 is obtained. In a first iterative step S3.1, a cross-section surface is milled by the FIB beam 51 at the predetermined y-position and the predetermined angle GF into the inspection volume 160. In a second iterative step S3.2 the new cross-section surface is imaged by the imaging charged particle beam 44 and a cross-section image slice is obtained and stored in the memory of the control unit 2. Steps 3.1 and 3.2 are repeated until the predetermined series of J cross-section images slices is completed.

In step S4, at least a first set of measured cross-section values v1 . . . vN of the first group of repetitive three-dimensional structures is determined. During this determination, cross-section image segments of the repetitive three-dimensional structures are detected in the series of J cross-section image slices by methods know in the art, and the cross-section values v1 . . . vN are determined. A cross-section values v1 can be an edge position, a center position, a radius, a diameter, an ellipticity or a cross-section area. For each cross-section values v1, a depth of the corresponding cross-section segment of the repetitive three-dimensional structures is determined. The depth determination can be performed by any of the methods of WO 2020/244795 A1 or by other methods.

In step S5, a plurality of initial reference values Vref(i=1 . . . M) of the first group of repetitive three-dimensional structures is determined within a first reference plane. The determination of initial reference values Vref(i=1 . . . M) and the position of the reference plane can also be part of step S2. Typically, reference values for the cross-section values of the first group of repetitive three-dimensional structures are known. For example, the reference values Vref(i=1 . . . M) are given by the center positions of a plurality of M individual HAR structures in the inspection volume. The typically raster of the center positions of a plurality of HAR-structures in a memory device is known and the reference values Vref(i=1 . . . M) can be represented by the design values of the raster of HAR structures. During step S5, the predetermined raster positions are aligned with respect to an average raster position determined from the first set of measured cross-section values v1 . . . vN and an appropriate plurality of initial reference values Vref(i=1 . . . M) in the reference plane is generated. In most 3D-memory designs, the raster of HAR structures is given by a hexagonal grid which allows the most compact packaging of the memory HAR structures. Such a grid is fully defined by the distance between the two adjacent HAR structures ("short pitch"), the lateral positions of at least one HAR structure and its orientation in the X-Y plane. In an example, the initial reference values Vref(i=1 . . . M) are obtained by a best-fit grid matching the measured center position of the HAR structures in at least one cross-section image slice. In another example, the initial reference values Vref(i=1 . . . M) are obtained from design information and precision alignment at reference marks. In another example, the initial reference values Vref(i=1 . . . M) are determined by explicit measurements of the short pitch and other geometrical parameters in the images.

The selection of the reference plane can be for example at or close to the bottom in the inspection volume. Thereby, the effect of alignment errors of upper layers are minimized. The reference depth $z_{ref}$ of the reference plane can also be selected close to the top of the inspection volume, where milling and imaging artefacts are minimized.

In step S6, a first set of L parameters P1, . . . PL of a first parameter model V(z; P1 . . . PL) is determined. The first parameter model V(z; P1 . . . PL) is selected in step S2 and is intended to match the first set of measured cross-section values v1 . . . vN and the plurality of initial reference values Vref(i=1 . . . M). The parameters can represent a tilt component, a curvature, an oscillation frequency, an oscillation amplitude, a power amplitude, or any higher coefficient of a series expansion of the average dependency of the first group of repetitive three-dimensional structures over depth or z-coordinate. The actual parameters of the first group of repetitive three-dimensional structures are then derived for example by least square optimization.

Next, step S6 is described in more detail at an example of a plurality of HAR structures with a number M of HAR structures by an index m=1, 2, . . . , M. The selection of the series of J cross-section images slices according to step S2 is performed that for each HAR structure in the inspection volume at least one cross-section and one cross-section value—here for example center position ($x^n$, $y^n$)—is measured at least at one z-position. However, generally the number N of cross-section values will be larger than M, for example M<=N<M*J. The Z-coordinate $z^n$ of a center position ($x^n$, $y^n$) is determined for example from a depth map $Z_j$(x,y) of the corresponding cross-section image slice. The average center positions $\hat{x}(z)$ and $\hat{y}(z)$ over z of the HAR structures can be described by $$\begin{cases} x^n = x^m_{ref} + \hat{x}(z), \\ y^n = y^m_{ref} + \hat{y}(z), \end{cases} \quad (1)$$

with the first initial reference values $$V1ref(1 \ldots M) = x^m_{ref}$$

and second initial reference values $$V2ref(1 \ldots M) = y^m_{ref}$$

are given by the x- and y-positions of the HAR structures in the reference plane at position depth $Z_{ref}$. The initial reference values of the centroids $$x^m_{ref}, y^m_{ref}$$

can be determined according to step S5.

In a general case, not every HAR structures will be present as cross-section segment in every cross-section image slice. Therefore, generally the number N of values and the number N of equations will be between M and J×M. The functions $\hat{x}(z)$ and $\hat{y}(z)$ are describing the average trajectory of the plurality of HAR structures and can be expressed in a form of analytical functions with finite and optionally small number L of parameters $p_l$. The averaged x-coordinate $\hat{x}(z)$ is described by $$\hat{x}(z) = \hat{x}(p_1, p_2, \ldots, p_L; z), \quad (2)$$

Optionally, L<<M for a stable and accurate solution. For example, $\hat{x}(z)$ can be represented as a polynomial of the order L-1. If L is sufficiently small compared to the total number N of equations (1), the functions $\hat{x}(z)$ and $\hat{y}(z)$ can be found by solving the overdetermined system of equations (1) using any least-square minimization method. In another example, $\hat{x}(z)$ can be described by an additional harmonic function such as sinus or cosine with at least three parameters amplitude, frequency and offset phase.

The parameters P1 . . . PL describe for example a tilt, a curvature, an oscillation frequency, a oscillation amplitude, or a higher order power amplitude of an average three-dimensional structure such as an HAR structure. For example, if only a tilt angle of the HAR-structures is to be determined in the inspection task, L can be set to L=2.

In a further example, the system of equations is solved by using an iterative algorithm. In step 6.1, the initial reference centroid positions $$x^m_{ref}, y^m_{ref}$$

derived in step S5 are used to compute the average functions x̂(z) and ŷ(z). For example, the parametrized functions x̂(z) and ŷ(z) are (here illustrated at the example of the x-coordinate) are derived by least square optimization of the set of N equations.

$$x^n(z_n) = x^m_{ref} + \hat{x}(P_1, P_2, \ldots, P_L, z_n) \quad (3)$$

with $z_n$ being the actual z-position of a cross-section value $x^n$. From the solution of equation (3), a set of optimized parameter values $P_1, \ldots P_L$ describing the average x-position of a HAR structure trough z-position is obtained. In step 6.2, the refined HAR structure reference positions in the reference plane are computed from the equation (3) with the obtained parameters $P_1, \ldots P_L$:

$$x^M_{conf} = \frac{1}{N}\sum_{n=1}^{N}[\hat{x}(P_1, P_2, \ldots, P_L, z_n) - x^n(z_n)]. \quad (4)$$

Step 6.1 is repeated with the confined x-position $$x^M_{conf}$$

and a confined set of parameter values P'i, . . . $P'_L$ is obtained. Steps 6.1 and 6.2 can be repeated until a change of the parameters from iteration to iteration is below a certain threshold.

In step S7, finally the parameter values determined in step S6 are attributed to the inspection site and stored in the memory of the control unit 2 or written to an inspection file.

Figure 5:
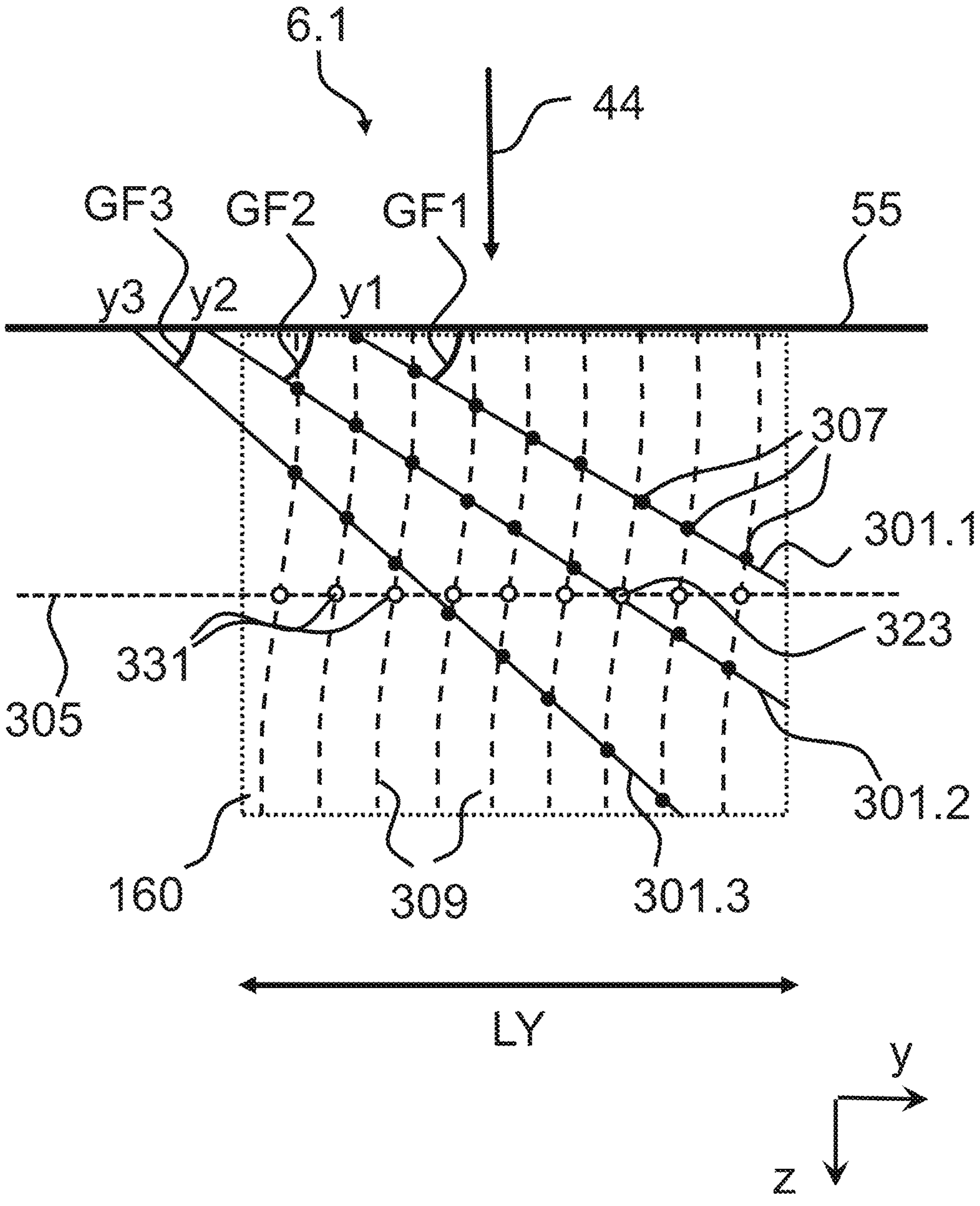
FIG. 5 illustrates an example of a set of cross-sections through an inspection volume.
Figure 6:
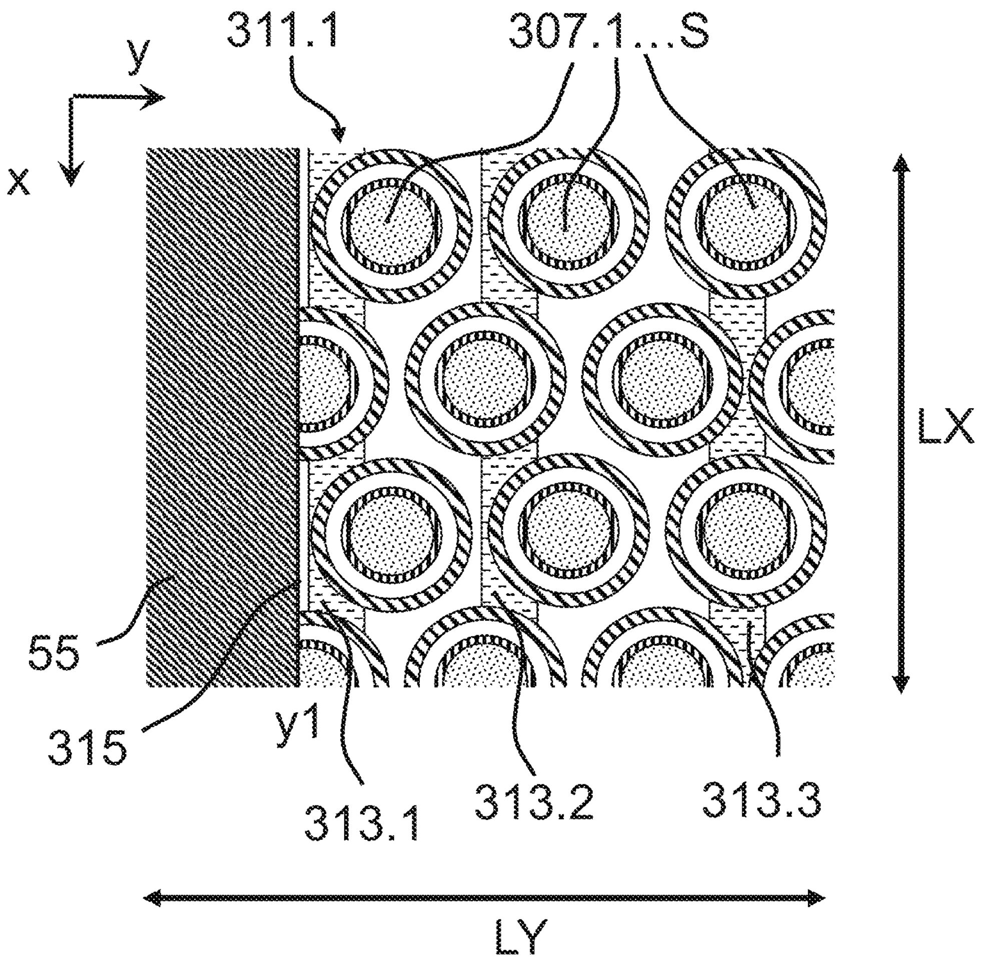
FIG. 6 illustrates a slanted cross-section image slice through a plurality of HAR structures.
Figure 7A:
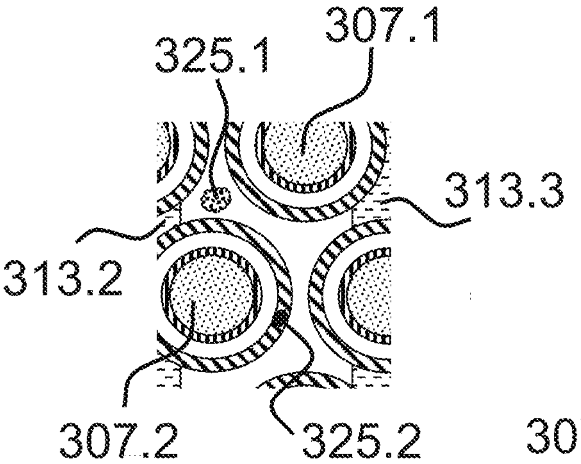
FIGS. 7A-7D illustrate steps of a processing of a cross-section image slice.
Figure 7B:
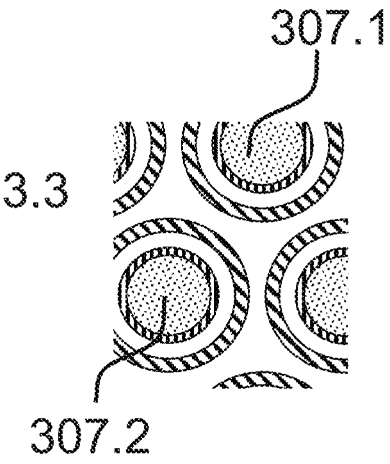
Figure 7C:
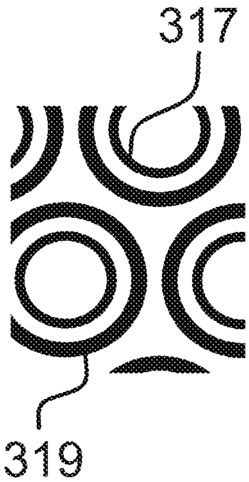
Figure 7D:
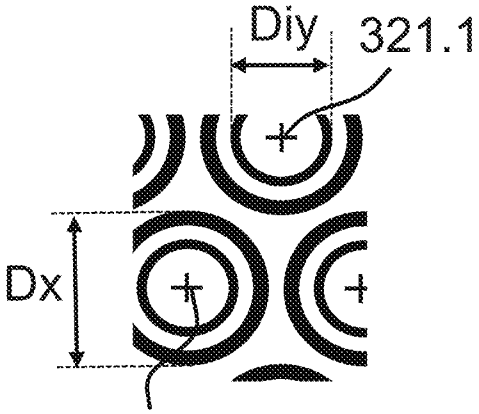

FIG. 5 illustrates an example of the method according to the second embodiment. The inspection site 6.1 with the inspection volume 160 is aligned under the charged particle imaging system for imaging during use with the imaging charged particle beam 44. A series of J=3 cross-section surfaces 301.1, 301.2 and 301.3 is determined by their milling position y1 to y3 and their milling angle GF1 to GF3. The spacing between two y-positions at the surface 55 of the wafer can be equal or different. The angles GF1 to GF3 can be equal or different. Under control of the control unit 19, the cross-section surfaces 301.1, 301.2 and 301.3 are then milled sequentially into the inspection volume 160 at angles GF1 to GF3, an after each milling of a surface with the FIB beam (not shown), a corresponding cross-section image slice is obtained by the imaging charged particle beam 44. Each of the 2D cross-section image slices comprise several cross-section images 307 of the plurality of HAR structures 309. The plurality of HAR structures 309 is indicated by the dashed and curved vertical lines, of which only two are indicated with label 309. The cross-section images 307 visible in the cross-section surfaces 301.1, 301.2 and 301.3 are indicated by filled dots, of which only three are indicated with label 307. The total number of cross-section images of HAR structures is N. From the N cross-section images 307, N cross-section values v1 . . . vN are determined. The identification of the cross-section images of HAR structures is explained in more detail at FIG. 6. FIG. 6 shows a cross-section image slice 311.1 generated by the imaging charged particle beam and corresponding to the cross-section surface 301.1. The cross-section image slice 311.1 comprises an edge line 315 between the slanted cross-section and the surface 55 of the wafer at the edge coordinate y1. Right to the edge, the image slice 311.1 shows several cross-sections 307.1 . . . 307.S through the HAR structures which are intersected by the cross-section surface 301.1. In addition, the image slice 311.1 comprises cross-sections of several word lines 313.1 to 313.3 at different depths or z-positions. With these word lines 313.1 to 313.3, a depth map $Z_1$(x,y) of the slanted cross-section surface 301.1 can be generated. FIGS. 7A-7D illustrate at a simplified example. FIG. 7A shows a segment of the cross-section image slice 311.1, comprising cross-sections 307.1 and 307.2 of HAR structures and cross-sections of word lines 313.2 and 313.3. The cross-section image slice 311.1 can further comprise some defects or imaging artefacts 325.1 and 325.2. In a first step, the image is cleaned and the cross-sections of word lines 313.2 and 313.3 are removed by filtering techniques, for example a threshold filtering or an erosion process. The filtering can also be performed by feature or pattern recognition methods known in the art, for example by edge detection, Fourier filter or correlation techniques including machine learning methods. The result of the cleaned image is shown in FIG. 7B. The cross-sections 307.1 and 307.2 of the HAR structures are then approximated to parameterized models of the cross-sections, for example by two circular rings 317 and 319 (FIG. 7C). From these rings, the cross-section values v1 . . . vS can be determined, for example the diameter Dx of the outer rings 319, the diameter Diy of the inner ring 317, or the center positions 321.1 and 321.2 (FIG. 7D). This process is repeated for the series of J cross-section image slices, until the first set of measured cross-section values v1 . . . vN is completed.

After determining the first set of measured cross-section values v1 . . . vN, the plurality of initial reference values Vref(i=1 . . . M) of the HAR structures is determined within a first reference plane 305 (see FIG. 5, for illustration the initial reference values Vref(i=1 . . . M) are shown and indicated by reference numbers 331). In this example, the z-position of reference plane 305 is selected according to the depth of a selected reference feature 323 and the predefined hexagonal raster of the HAR structures is aligned with respect to this selected reference feature 323. With this completed set of data, the method of determination parameter according to step S6 can be performed.

Figure 8:
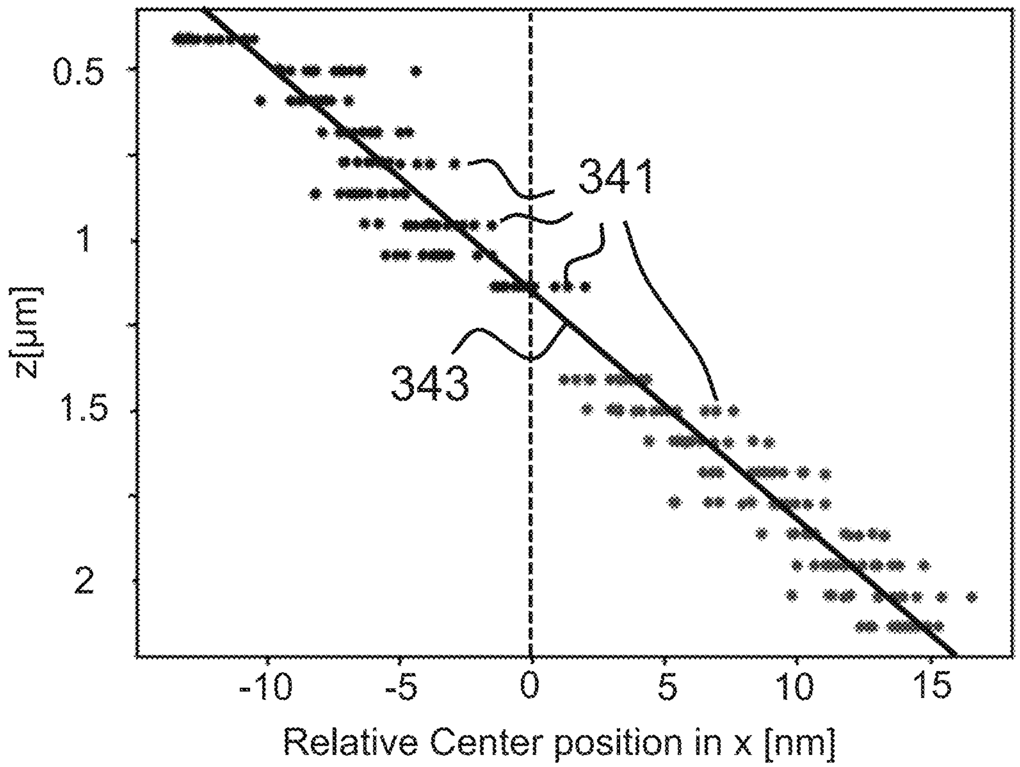
FIG. 8 illustrates a simple example of a parameter obtained according to the method of the disclosure.

FIG. 8 illustrates the set of measured cross-section values v1 . . . vN relative to the initial reference values Vref(i=1 . . . M) at the example of the x-coordinate. The relative center positions $$xr^n = \left[x^n(z_n) - x^m_{ref}\right]$$

are indicated by the black dots (some labeled with reference number 341). A parameterized average x-position of a HAR structure trough z-position is fitted to the relative values:

$$xr^n = x^n(z_n) - x^m_{ref} = \hat{x}(P1, \ldots PL, z_n) \quad (5)$$

In this example, the set of optimized parameter values $P_1, \ldots P_L$ comprise a dominating linear parameter P1, illustrated by the average x̂(z) illustrated in FIG. 8 by reference number 343.

Figure 9:
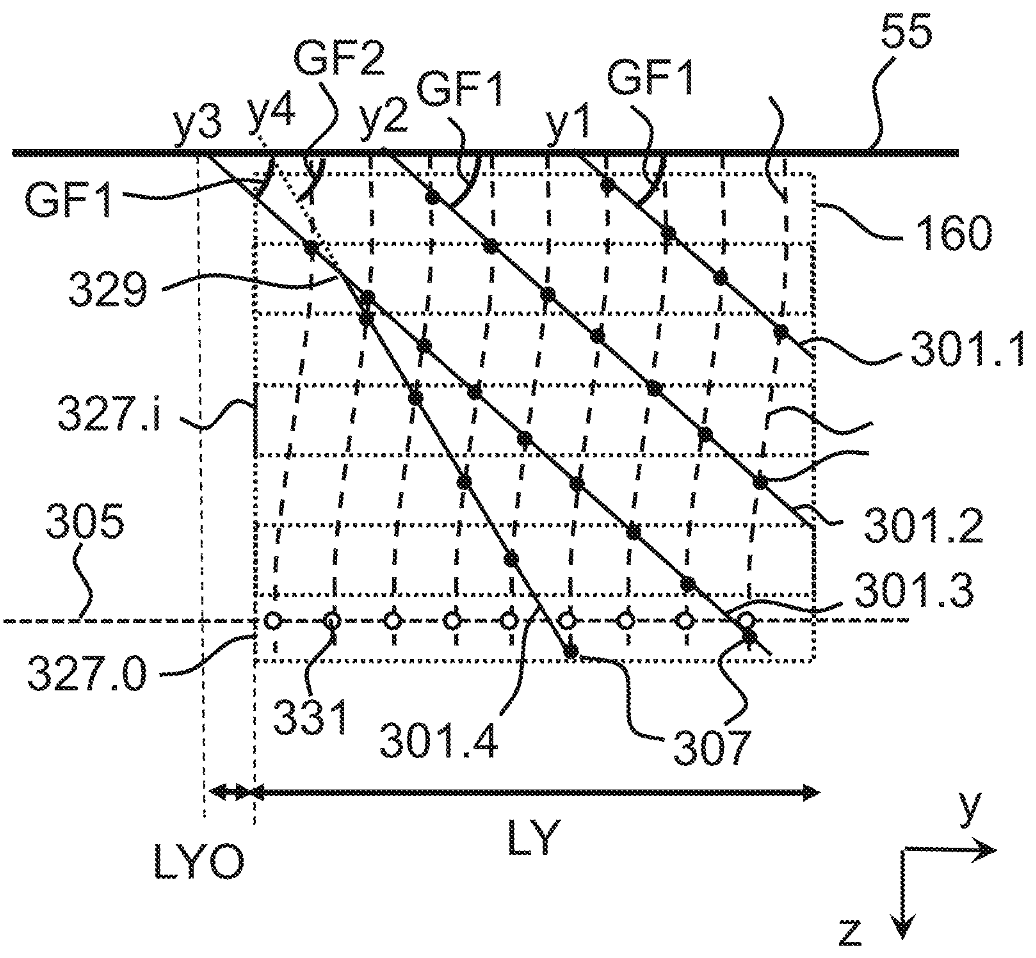
FIG. 9 illustrates an example of slanted cross-section image-slices through a plurality of HAR structures.

FIG. 9 illustrates another example of the method according to the second embodiment. One disadvantage of the conventional 3D volume image generation is the destruction of a large area of extension LYO adjacent to an inspection volume 160 in a wafer. FIG. 8 illustrates an example, where this area is reduced. The reduction of the destroyed area of extension LYO is achieved by milling at different angles, for example by application of a scan rotation. In a first step, for example three cross-section surfaces 301.1 to 301.3 are milled at positions y1 to y3 through the inspection volume 160 at a first angle GF1 and the first three cross-section image slices are obtained. In a second step, a fourth cross-section surface 301.4 is milled into the inspection volume 160 at a larger milling angle GF2 and with a y-coordinate at the surface 55 y2>y4>=y3, such that the y-coordinate y3 determined the area of extension LYO adjacent to an inspection volume 160.

The fourth cross-section surface 301.4 forms an edge 329 with the third cross-section surface 301.3 and allows a determination of additional cross-section values at deeper levels below the edge 329. Thereby it is possible to obtain more cross-section values at deeper levels inside the inspection volume 160. This is indicated by a plurality of depth zones 327.*i*, separated by the dashed horizontal lines in FIG. 9. By this determination of the series of J cross-section images slices through the inspection volume 160 it is achieved that in each depth zone 327.*i* at least two cross-section values can be measured, including in the lowest depth zone 327.0, while keeping the destroyed area of extension LYO adjacent to the inspection volume 160 at a minimum, for example with LYO below 10% of LY.

Figure 10:
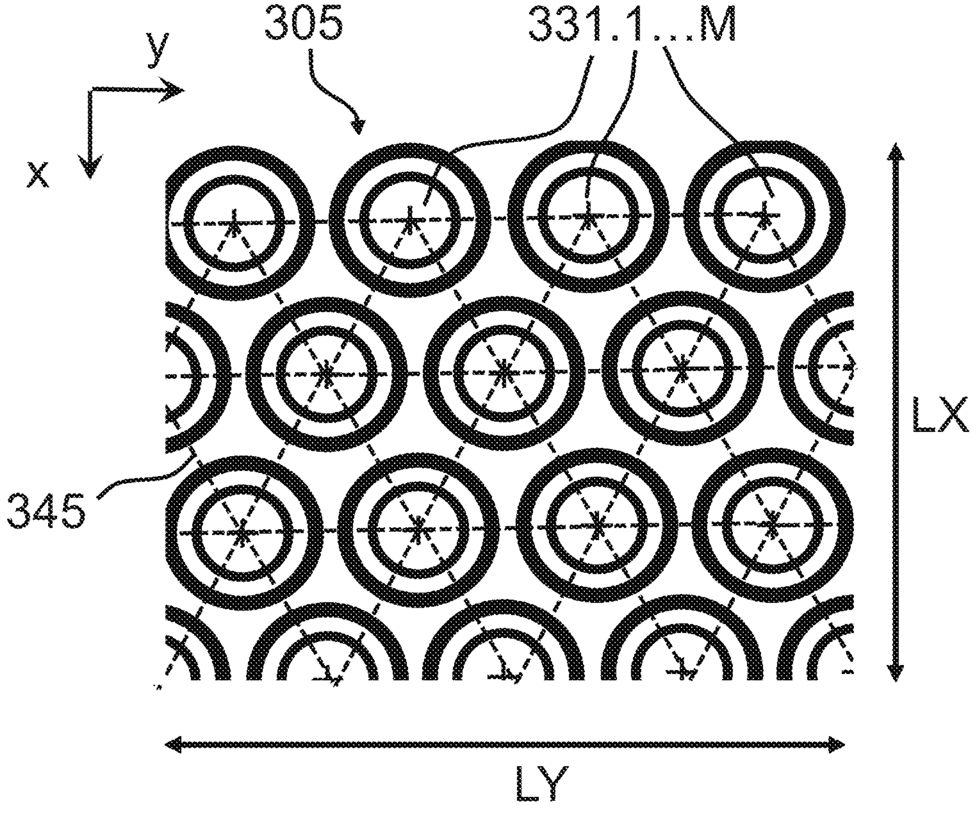
FIG. 10 illustrates a reference raster of a plurality of repetitive semiconductor structures.

FIG. 10 illustrates a hexagonal raster 345 of reference features 331.1 . . . M of a plurality of HAR structures in the reference plane 305. In general, the raster 345 of the group of repetitive three-dimensional structures inside of an inspection volume 160 can for example be given from design information or from a reference measurement. This raster 345 can be used to compute the plurality of initial reference values Vref(i=1 . . . M) of the M repetitive three-dimensional structures.

With the method of the second embodiment, certain drawbacks in known approaches can be addressed. Milling and imaging time can be significantly reduced by a factor of 50 or even more, for example a factor of 300. Especially with the iterative method, the accuracy of the determination of the parameters and confined reference values can be improved.

Figure 11A:
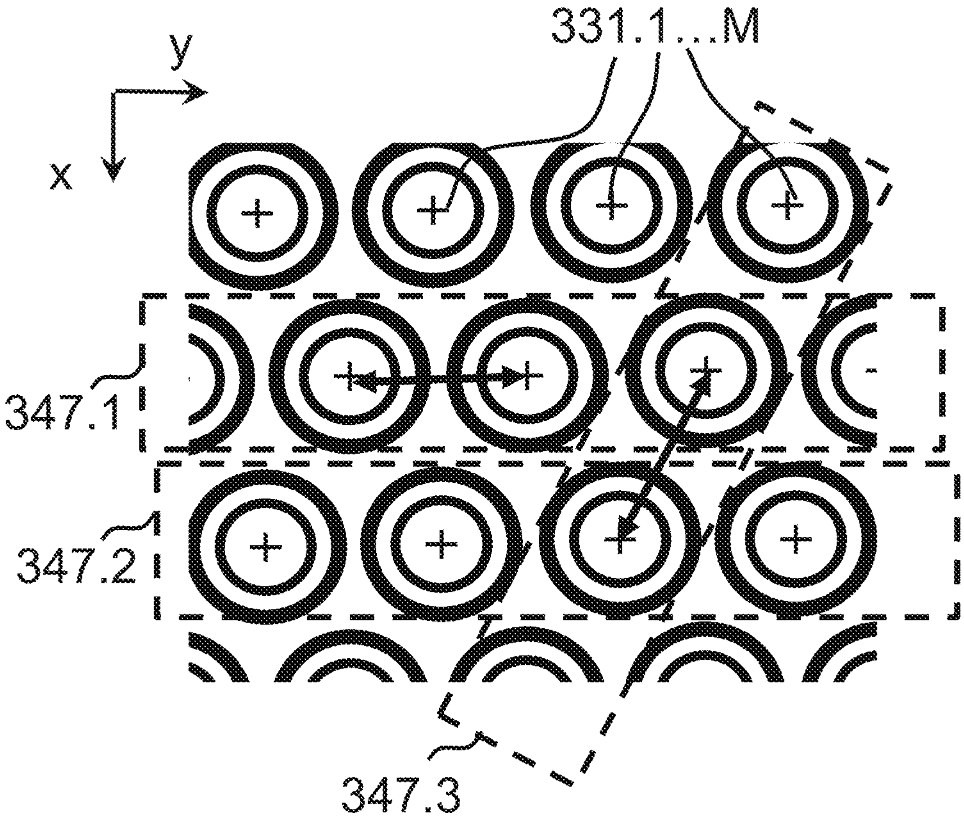
FIGS. 11A-11B illustrate rows or columns of groups of HAR structures and a fist and second raster grid.
Figure 11B:
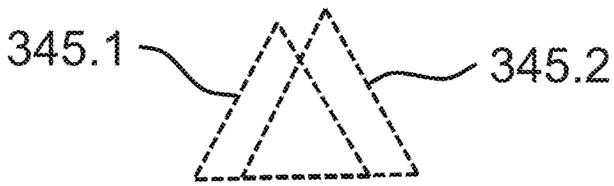

According to the third embodiment of the disclosure, the plurality of cross-section image features are grouped in several groups. FIGS. 11A-11B show an example of a first group of repetitive three-dimensional structures 347.1, a second group of repetitive three-dimensional structures 347.2, and/or a third group of repetitive three-dimensional structures 347.3. With such groups in rows or columns through the raster 345, a raster pitch in different directions (see arrows between two raster grid points in the groups 347.1 and 347.3) can be obtained independently. An additional aspect of the third embodiment is the ability to independently reconstruct the repetitive three-dimensional structures at different position of the sample along one coordinate. For example, the HAR structures belonging to different rows 347.1 and 347.2 located at different X-coordinates can be reconstructed separately. This method can be utilized to investigate possible variations of the properties of HAR structures along a certain direction. The sample can be rotated around Z-axis to make the row or column direction of interest parallel to a preferred direction.

Figure 12A:
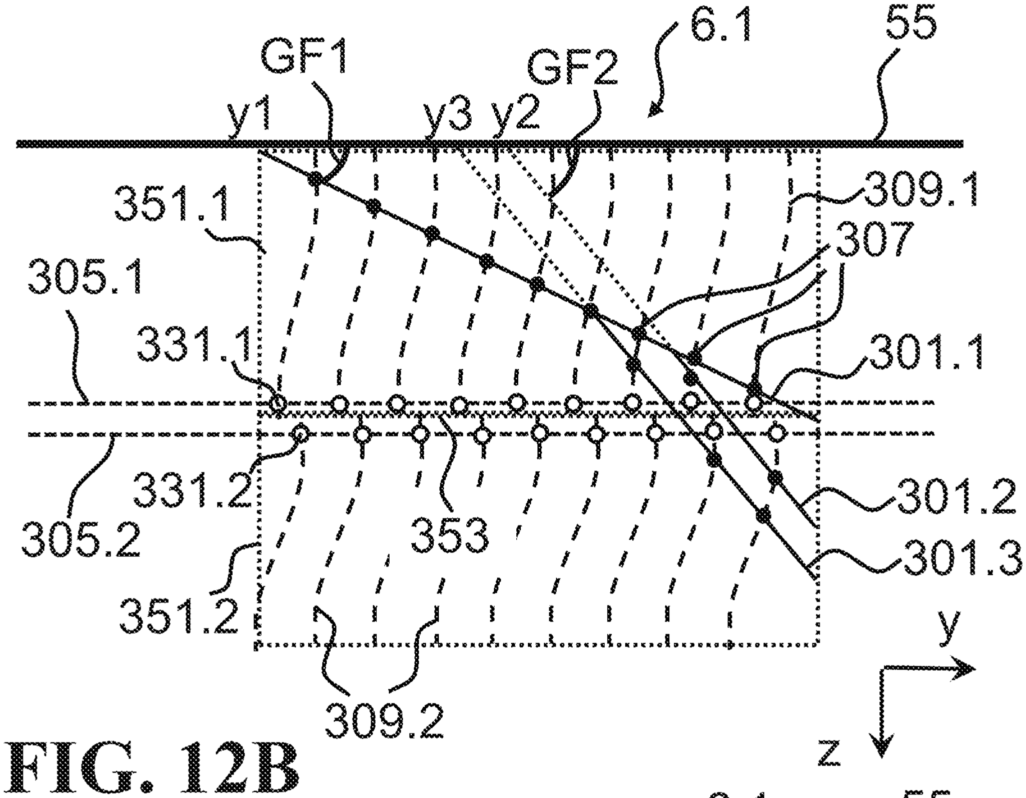
FIGS. 12A-12B illustrate an example of an overlay determination with high throughput and reduced milling and imaging area.
Figure 13:
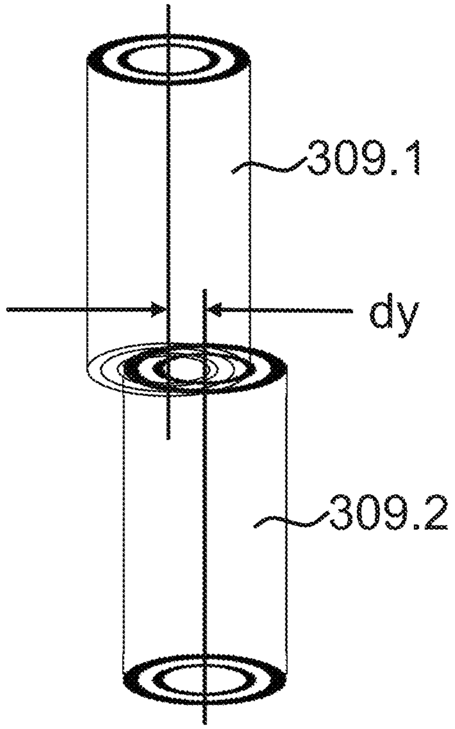
FIG. 13 illustrates an overlay error of two stacks or decks of HAR structures.

In the fourth embodiment, the grouping into different groups of repetitive three-dimensional structures is performed according to the depth or z-coordinate of a measured cross-section values v1 . . . vN. Typically, memory devices comprise several layers of HAR structures, which are stacked on top of each other. FIG. 12A illustrates the method according to the fourth embodiment at an example of two layers of HAR structures 351.1 and 351.2 with the interface 343 between the two layers. A first set measured cross-section values v1 . . . vN is grouped into the first group of repetitive three-dimensional structures, if their depth is in a range of the first layer 351.1. The second set of measured cross-section values u1 . . . uN2 is grouped into the second group of repetitive three-dimensional structures, if their depth or z-position is in a range of the second layer 351.2. The first plurality of initial reference values Vref(i=1 . . . M) is determined in a first reference plane 305.1 and the second initial reference values Uref(i=1 . . . M2) are determined in the second reference plane 305.2. In this example, both reference planes 305.1 and 305.2 are selected close to the interface 353 of the first and second layer 351.1 and 351.2, such that a difference between the properties in the first layer and the second layer can be determined with high precision. The different parameters describing the average properties of the two groups of repetitive three-dimensional structures in the first and second layer 351.1 and 351.2 can each be computed by the method according to the second embodiment. FIG. 13 illustrates an example of an overlay error, described by a difference dy between an average HAR structure position in the first layer and an average HAR structure position in the second layer.

Figure 12B:
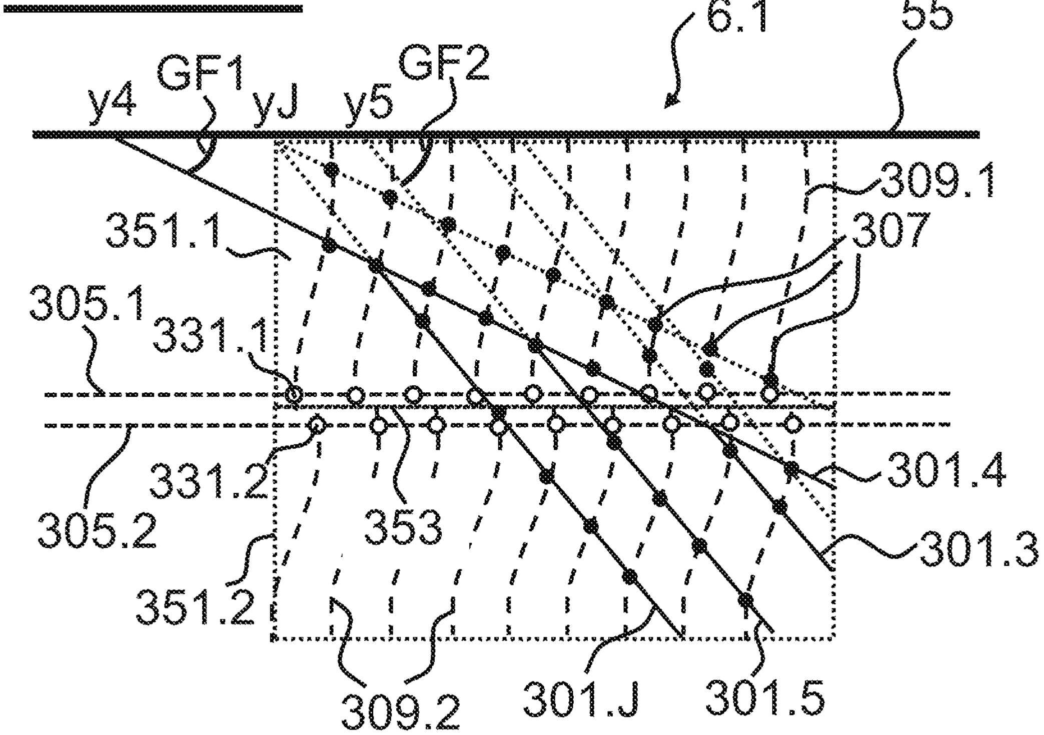

In the example of the fourth embodiment of FIG. 12A, an efficient method to determine the overlay error is given. Especially at the example of a 3D-Memory stack (like VNAND or 3D-NAND), a critical part is the transition or interface between two layers or "decks". The HAR memory structures or channels from a first deck match the corresponding channels an adjacent deck. To monitor any possible offset of the channels between the two decks it is sufficient to acquire a sub-volume close to the deck interface. Thereby, it is possible to significantly reduce the milling and imaging time by selecting the cross-section image slices in a way to reduce the overall imaging and slicing area. Furthermore, the method reduces the milling length of the cross-section surfaces and the homogeneity of the milling can be improved. The efficient method with reduced milling and imaging area and time is achieved by a proper selection of the sequence of y-position and milling angles GF of cross-section surfaces 301. The series of J cross-section image slices comprises a first image surface 301.1, milled at a first angle GF 1 at a first y-position y1 such that the depth of the interface 353 is reached by the first cross-section surface 301.1. Two further cross-section surfaces 301.2 and 301.2 are then milled an imaged at a second milling angle GF2, which is larger compared to GF1, for example GF2=2×GF1 or GF2=20°+GF1. The y-coordinates are selected with y2>y3>y1. With the two or more further cross-section surfaces 301.2 and 301.3 at GF2 after the first cross-section surface 301.1 at angle Gf1, the milling and imaging surface areas are significantly reduced and concentrated around the interface 353. The process can be repeated as illustrated in FIG. 12B with in this example a fourth cross-section surface 301.4 generated again at the first angle GF1 at y-coordinate y5<y1, and consecutively at least one further cross-section surface 301.5 at position y5<y3 at the second angle GF2. Thereby, a plurality of measured cross-section values v1 . . . vN and u1 . . . uN2 can be determined and the refined positions of the HAR structures in the reference planes 305.1 and 305.2 of both layers 351.1 and 351.2 can be determined according to the method of the second embodiment. From the difference of the refined positions of the HAR structures in the reference planes 305.1 and 305.2, an overlay error is be determined. The at least two different milling angles GF1 and GF2>GF1 can be achieved by a mechanical tilt of the FIB column and/or the wafer stage holding the wafer/sample. In a further example, the so-called “scan rotation” or deflection of the FIB beam in the z-direction can be used. By the scan rotation, the plane in x-direction, in which the FIB performs the milling, is changed.

With a typical z-extension LZ of a 3D-Memory stack of about LZ=5 μm to 10 μm or more, the depth range to be covered for the extraction of an overlay error can be reduced to about below 2 μm, such as even below 1 μm, for example about 0.5 μm, and the milling and imaging time according to the fourth embodiment can be reduced by a factor of about 10.

According to a fifth embodiment of the disclosure, the method of parameter determination can be improved by using a priori knowledge. A-priori information can be design information or a “calibrating” or precision 3D-volume image generated by any of the methods described in WO 2021/180600A1 obtained from a reference position of the same wafer or from a reference wafer by milling and imaging about at least 100 to 1000 or more cross-section surfaces. A first example of the method according to the fifth embodiment is explained at FIG. 10. The determination of the grid 345 of HAR features intersecting the reference plane here is taken from design information. However, it is also possible to use a precision 3D-volume image of a reference inspection position to determine the plurality of initial reference values of grid positions. Thereby, a systematic and expected distortion or deviation from a perfect grid is considered in the parameter determination according to the method of the second embodiment. An example is shown in FIG. 11 with a different spacing or magnification in x-direction compared to the spacing in y-direction (see grid cell 345.1 of the perfect grid of FIG. 10 and grid cell 345.2 of the distorted gird in FIG. 11*b*).

Figure 14:
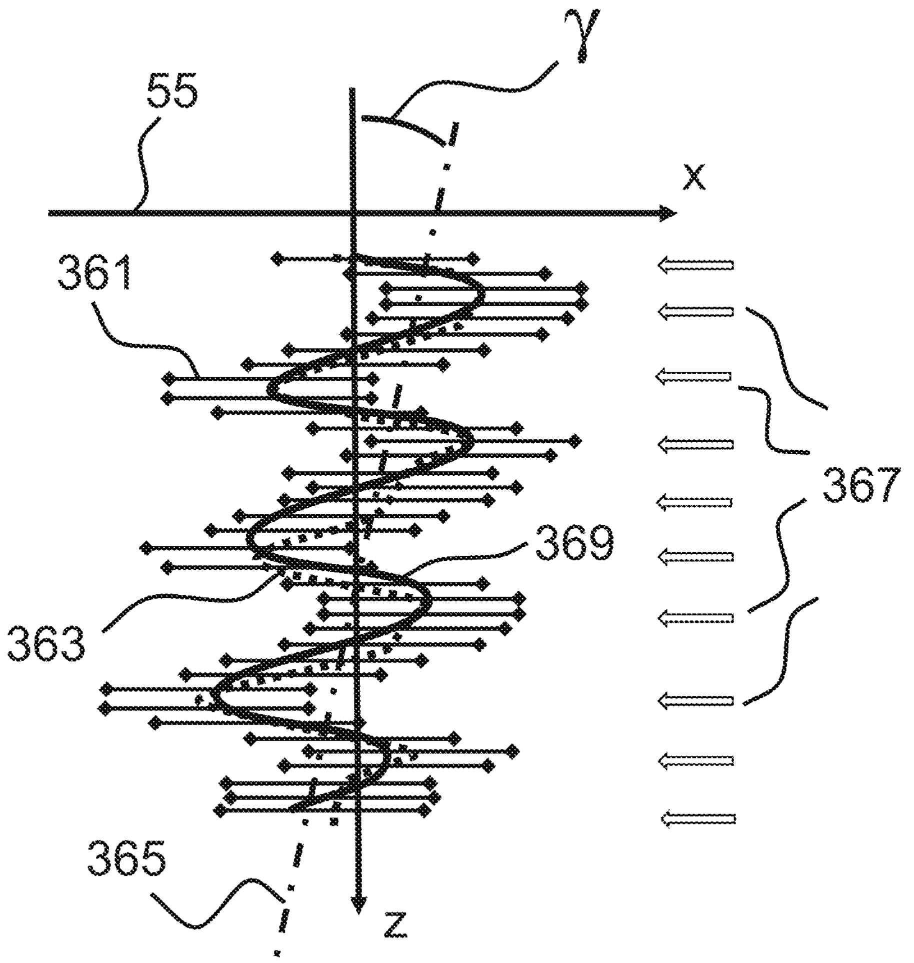
FIG. 14 illustrates a determination of an equidistant sampling condition from a priori information.

A second example of a method by using a prior knowledge is illustrated in FIG. 14. In this example, a typical z-dependency of an average center position of an HAR structure or channels is known from a 3D volume inspection at a representative inspection position or reference position. The average HAR channel trajectory 363 (dotted line) is derived from the approximation of the distribution of lateral displacements 361 at each depth level z. The lateral displacements are determined by their relative displacement to the predetermined raster grid. According to this example of the fifth embodiment, the parametrization for step S6 for the method according to the second embodiment is derived from average HAR channel trajectory 363 from the 3D-Volume image. The average HAR channel trajectory 363 is approximated by a parametric curve 369 (solid line), $$\hat{x}(P1, \ldots PL, z) = P1 \cdot z + P2 \cdot \cos(P3 \cdot z + P4) \quad (6)$$

In the example of FIG. 14, the parametrization can comprise a linear tilt component P1=tan(γ) (see line 365 in FIG. 14), an amplitude P2 of the harmonic function, a frequency P3 of an harmonic function, and an offset phase P4 of the harmonic function.

Furthermore, from the expected frequency from the reference 3D-volume image, a minimum sampling rate dz of z-positions 367 of the cross-section values v1 . . . vN to be measured is determined. In a next step, the series of J cross-section image slices is configured to enable a measurement of cross-section values v1 . . . vN with at least the sampling rate dz. With the proper sampling rate dz, the expected frequency P3 can be determined from the cross-section values v1 . . . vN of the series of J cross-section image slices with only few cross-section image slices with J<10, such as J<5, for example J=3. In an example, a single cross-section image slice with J=1 with slanted angle GF is sufficient to obtain a desired set of cross-section values v1 . . . vN at a given sampling rate dz in z.

Figure 15:
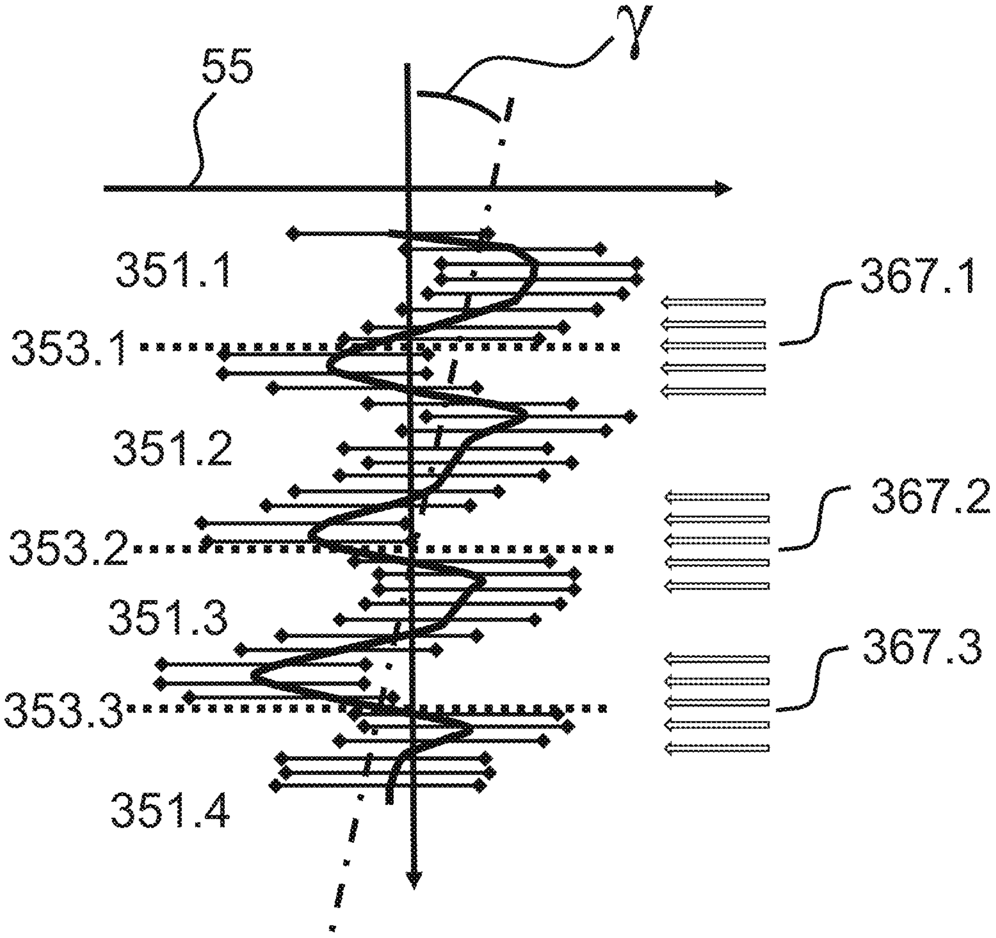
FIG. 15 illustrates a determination of a dense sampling condition from a priori information.

However, depending on the interest of the manufacturer, also different sampling conditions can be determined from a-priori information. For example, there might be a special interest in the overlay error of the several decks or layers 351.1 to 351.4 of HAR structures. In such an case, a dense sampling at the interfaces 353.1 to 353.3 of the layers can be used. In the example of FIG. 15, three dense sampling regions 367.1 to 367.3 are selected and the y-positions and angles of the series of J cross-section image slices are configured to enable a measurement of cross-section values v1 . . . vN at the dense sampling positions 367.1, 367.2 and 367.3. A simplified dense sampling at a single interface position is illustrated in FIG. 12 and described in the fourth embodiment of the disclosure.

The previous examples illustrate the embodiments of the disclosure at the example of the center position of the HAR channels or structures for the measured cross-section values v1 . . . vN. However, the embodiments of the disclosure can also be applied to any other measured cross-section values v1 . . . vN of interest. The cross-section values v1 . . . vN of interest can for example be a diameter or CD of repetitive three-dimensional structures. A minimum sampling rate of a condition for dense sampling or any combination of both can be derived from a 3D volume measurement at a reference position of an inspection volume of the same wafer or of a reference wafer out of a batch of wafers.

Figure 16A:
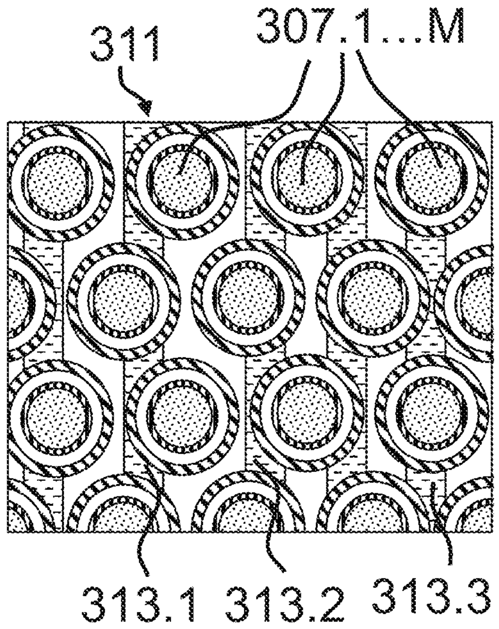
FIGS. 16A-16C illustrate a correction factor for the determination of parameters from slanted cross-section image slices.
Figure 16B:
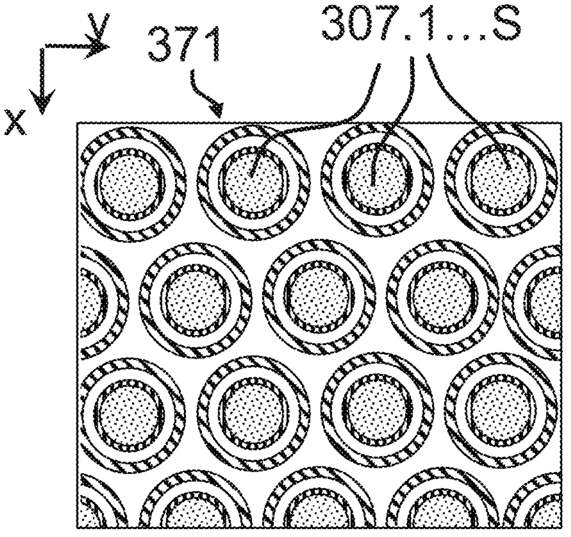
Figure 16C:
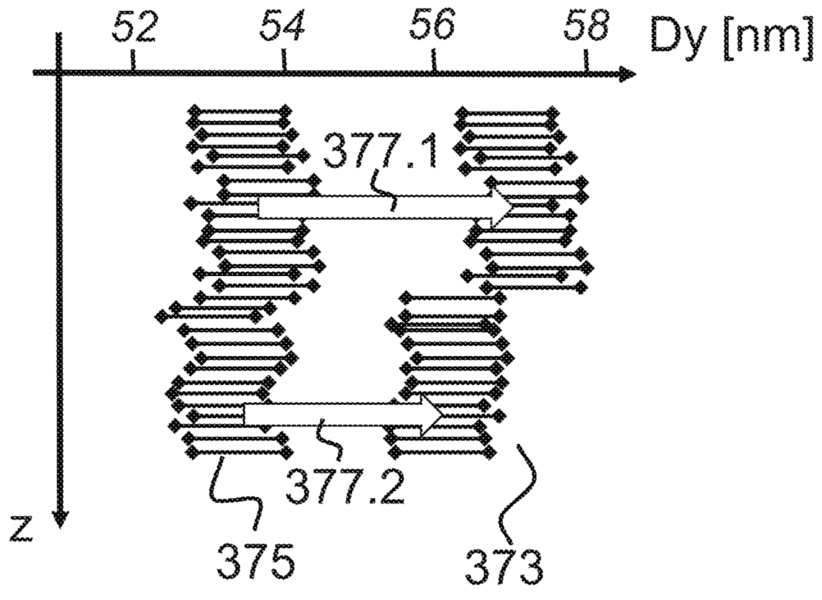

FIGS. 16A-16C illustrate another example of the fifth embodiment. FIG. 16A illustrates a cross-section image slice 311 obtained from a cross-section surface at a slanted milling angle GF. The cross-section image slice comprises cross-sections 307.1 . . . 307.M of the HAR structures and several cross-sections of the metal layers or word lines, including cross-sections 313.1 to 313.3. In FIG. 16C, the measured diameters Dy in y-direction of the cross-sections 307.1 . . . 307.M of the HAR structures are illustrated by the horizontal lines 373, illustrating the distribution of diameters of HAR features in the slanted cross-section image slice 311. FIG. 16B illustrates a virtual cross-section image slice 371, obtained from a high-resolution, 3D volume image of the inspection volume. The computation of a virtual image slice is described in WO 2021/180600A1 cited above and incorporated here within. The position of the virtual image slice can be selected to be free of metal or word lines. The corresponding distribution of diameters of HAR features in the virtual image slice 371 are illustrated in FIG. 16C with reference number 375. With this a-priori information of a determination error between a measurement in a virtual image slice from a high-resolution measurement and a measurement in a slanted cross-section image, a correction factor or correction value 377 can be applied to the measured cross-section values v1 . . . vN of the method according to the second embodiment. The correction value can also depend on the z-position, as illustrated in FIG. 16C by the first correction value 377.1 and the second correction value 377.2, depending on the z-position.

Figure 17:
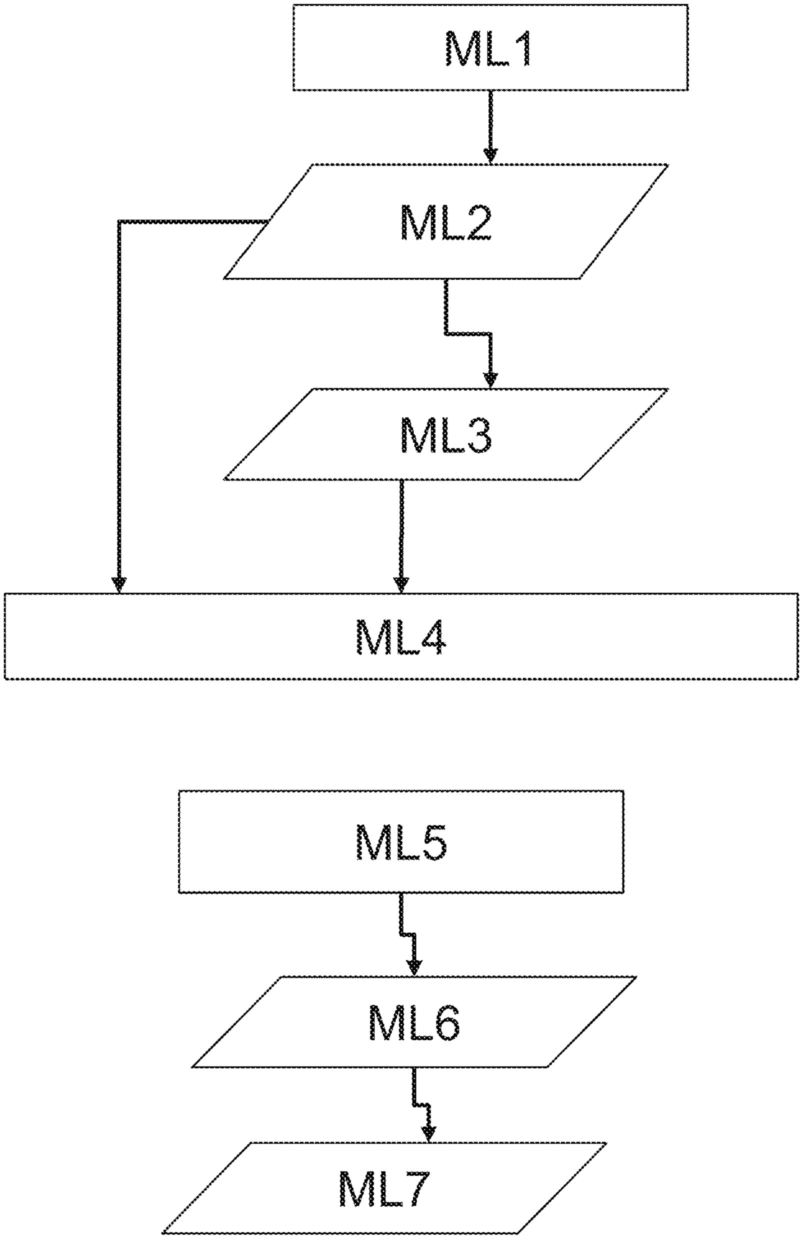
FIG. 17 illustrates a machine learning algorithm for the method of 3D parameter determination from a reduced set of cross-section image slices.

A sixth embodiment of the disclosure is illustrated in FIG. 17. The sixth embodiment describes a further method of inspection of 3D volumes at inspections sites of wafers with high precision and high throughput. According to the sixth embodiment, this is achieved by a machine learning method.

From a 3D-volume image data of high resolution (i.e., with a plurality of more than 100, such as more than 1000 image slices), properties of included 3D structures can be determined, for example an averaged tilt angle of repetitive semiconductor structures, a minimum diameter, a distance, a bending, or an overlay error, and a plurality of image slices or virtual image splices can be extracted. With the plurality of image slices or virtual image slices, a first machine learning algorithm can be trained and a minimum set of cross-section images slices for the measurement of a property of a repetitive 3D structure can be determined. With a second machine learning algorithm, a property of a repetitive 3D structure can be determined from a minimum set of cross-section images slices with high accuracy and high throughput. The method is described by following steps.

In step ML1, a plurality of high-resolution 3D volume images of a representative inspection volume is generated. The plurality of high-resolution 3D volume images can be generated either by a slice and imaging method applied to representative test wafers or can be generated by simulation, for example by varying a 3D volume image obtained by a measurement.

In step ML2, the property of interest of a repetitive semiconductor structure is determined from the plurality of high-resolution 3D volume images. Each high-resolution 3D volume image represents thus a specific property, described by at least one parameter. The plurality of high-resolution 3D volume images is labelled with the at least one parameter.

In step ML3, a plurality of labelled cross-section image slices is extracted or generated from the plurality of labelled high-resolution 3D volume images. The slices can be measured image slices or virtual image slices, computed from a high-resolution 3D volume image.

In step ML4, a machine learning model is trained with the plurality of cross-section image slices and the plurality of high-resolution 3D volume images. The training can be achieved iteratively to determine the minimum set of cross-section image slices and to determine the parameter of interest with a given accuracy and confidence.

In step ML5, a set of measured cross-section image slices is determined, for example from a measurement at a new inspection site of a wafer.

In ML6, the trained model according to step ML4 is applied to the set of measured cross-section image slices.

In step ML7, the output of the parameter and the confidence value according to the trained model is generated for the new inspection site of the wafer.

The method and the trained model can be improved by further iterations and adaption of the trained model to new inspection results at new wafers for measurement, including the generation of new 3D volume images by simulation, triggered for example by low confidence values according to step ML7.

The disclosure described by the embodiments can be described by following clauses, but is however not limited to the clauses:

Clause 1. A method of determining a first set of L parameters describing a first group of repetitive three-dimensional structures inside of an inspection volume of a semiconductor wafer, comprising: (a) obtaining a series of J cross-section image slices, comprising at least a first cross-section image slice at a first angle and a second cross-section image slice at a second angle through the inspection volume, (b) determining at least a first set of measured cross-section values v1 . . . vN of the first group of repetitive three-dimensional structures from the series of J cross-section image slices at different z-positions within the inspection volume; (c) determining a plurality of initial reference values Vref(i=1 . . . M) of the first group of repetitive three-dimensional structures within a first reference plane; and (d) determining the first set of L parameters P1, . . . PL by least square optimization of a first parameter model V(z; P1 . . . PL) to the first set of measured cross-section values v1 . . . vN and the plurality of initial reference values Vref(i=1 . . . M).

Clause 2. The method according to clause 1, wherein the first angle and the second angle are between 15° and 60° with respect to a surface of the semiconductor wafer.

Clause 3. The method according to clause 2, wherein the first angle is different from the second angle by more than 5°.

Clause 4. The method according to any of the clauses 1 to 3, wherein the number J of cross-section image slices is J<20, such as J<10, for example J=3 or J=2.

Clause 5. The method according to any of the clauses 1 to 4, wherein step of determining at least a first set of measured cross-section values v1 . . . vN comprises the determination of the depth or z-position of each of the first set of measured cross-section values v1 . . . vN.

Clause 6. The method according to clause 5, wherein the depth determination is performed at second features of known depth inside of the inspection volume of a semiconductor wafer.

Clause 7. The method according to clause any of the clauses 1 to 6, wherein the number J and the spacing of the series of J cross-section image slices and the first and/or second angles are adjusted such that in each predetermined interval of z-positions, at least two cross-section values of the first set of measured cross-section values v1 . . . vN are determined.

Clause 8. The method according to clause any of the clauses 1 to 7, wherein the step a) of obtaining a series of J cross-section image slices comprises: determining a sequence of z-positions of the cross-section values v1 . . . vN to be measured; and adjusting the number J and the spacing of the series of J cross-section image slices and the first and/or second angle according to the sequence of z-positions of the cross-section values v1 . . . vN.

Clause 9. The method according to clause 8, wherein the determining of the sequence of z-positions is based on a predetermined minimum sampling rate of z-positions for determining the first set of L parameters P1, . . . PL of the first plurality of M (HAR) structures.

Clause 10. The method according to clause any of the clauses 1 to 9, wherein in the step of determining a plurality of initial reference values Vref(i=1 . . . M) uses predetermined reference values about the first plurality of M High Aspect Ratio (HAR) structures inside of the inspection volume of the semiconductor wafer.

Clause 11. The method according to any of the clauses 8 to 10, further comprising the step of determining the predetermined sequence of z-positions or the predetermined sampling rate of z-positions and/or the predetermined reference values from a 3D volume image of a representative inspection volume of a representative wafer, obtained by slicing and imaging with a plurality of R cross-section image slices with a number of slices R>10×J, such as R>1000.

Clause 12. The method according to any of the clauses 1 to 11, further comprising the steps of (e) determining a plurality of first confined reference values Vcf(i=1 . . . M) in the first reference plane from the first set of parameters P1, . . . PL and the plurality of initial reference values Vref(i=1 . . . M); and (f) confining the first set of parameters P1, . . . PL by least square optimization of a first parameter model V(z; P1 . . . PL) to the first set of measured cross-section values v1 . . . vN and the plurality of first confined reference values Vcf(i=1 . . . M).

Clause 13. The method according to any of the clauses 1 to 12, wherein the series of J cross-section image slices comprises at least a third cross-section image slice at the second angle through the inspection volume, wherein the second angle is larger than the first angle.

Clause 14. The method according to any of the clauses 1 to 13, further comprising the step of scaling a measured cross-section value of the first set of measured cross-section values v1 . . . vN with a predetermined scaling parameter.

Clause 15. The method according to clause 14, wherein the predetermined scaling parameter is selected according to the angle of the cross-section image slice from which the measured cross-section value is obtained.

Clause 16. The method according to clause 14, wherein the predetermined scaling parameter is selected according to the depth of the measured cross-section value.

Clause 17. The method according to any of the clauses 1 to 16, wherein the set of parameters P1, . . . PL describe at least one of a tilt, a curvature, an oscillation frequency, a oscillation amplitude, a power amplitude of an average three-dimensional structure of the first group of repetitive three-dimensional structures inside of an inspection volume.

Clause 18. The method according to any of the clauses 1 to 17, wherein the first group of repetitive three-dimensional structures is given by a first plurality of high aspect ratio (HAR) structures of a memory device.

Clause 19. The method according to any of the clauses 1 to 18, wherein the cross-section values v1 . . . vN is at least one of the group of an edge position, a center position, a radius, a diameter, an eccentricity or a cross-section area of the first group of repetitive three-dimensional structures inside of an inspection volume.

Clause 20. The method according to any of the clauses 1 to 19, further comprising determining a second set of L2 parameters describing a second group of repetitive three-dimensional structures, comprising the step (b2) of determining at least a second set of measured cross-section values u1 . . . uN2 of the second group of repetitive three-dimensional structures from the series of J cross-section image slices at different z-positions within the inspection volume; (c2) determining a plurality of second initial reference values Uref(i=1 . . . M2) of the second group of repetitive three-dimensional structures within a second reference plane; and (d2) determining the second set of K parameters Q1, . . . QK by least square optimization of a second parameter model U(z; Q1 . . . QK) to the second set of measured cross-section values u1 . . . uN2 and the plurality of initial reference values Uref(i=1 . . . M)

Clause 21. The method according to clause 20, further comprising the steps of (e2) determining a plurality of second confined reference values Ucf(i=1 . . . M2) in the second reference plane from the second set of parameters Q1, . . . QK and the plurality of initial reference values Uref(i=1 . . . M2); and (f2) confining the second set of parameters Q1, . . . QK by least square optimization of a second parameter model U(z; Q1 . . . QK) to the second set of measured cross-section values u1 . . . uN2 and the plurality of confined reference values Ucf(i=1 . . . M2).

Clause 22. The method according to clause 20 or 21, further comprising

- determining a plurality of cross-section image features of a plurality three-dimensional structures in the series of J cross-section image slices;
- grouping the plurality of cross-section image features in first cross-section image features of the first group of repetitive three-dimensional structures and second cross-section image features of the second group of repetitive three-dimensional structures.

Clause 23. The method according to clause 22, wherein the repetitive three-dimensional structures are high aspect ratio (HAR) structures of a memory device, forming a first plurality of HAR structures and a second plurality of HAR structures.

Clause 24. The method according to clause 23, wherein the first plurality of HAR structures corresponds to a first stack of HAR structures and the second plurality of HAR structures corresponds to a second stack of HAR structures underneath the first stack, and wherein the grouping is performed according to the depth of a cross-section image feature.

Clause 25. The method according to clause 24, further comprising the step of determining, from the first set of L parameters P1, . . . PL and the second set of K parameters Q1, . . . QK an overlay error between the first and the second stack of HAR structures.

Clause 26. The method according to clause 22, wherein the first group of repetitive three-dimensional structures corresponds to a first row or column of repetitive three-dimensional structures and the second group of repetitive three-dimensional structures corresponds to a second row or column of repetitive three-dimensional structures, and wherein the grouping is performed according to a lateral position of a cross-section image feature.

Clause 27. The method according to clause 26, further comprising the step of

- determining a plurality of first confined reference values Vcf(i=1 . . . M) in the first reference plane from the first set of parameters P1, . . . PL and the plurality of initial reference values Vref(i=1 . . . M);
- determining a plurality of second confined reference values Ucf(i=1 . . . M2) in the second reference plane from the second set of parameters Q1, . . . QK and the plurality of initial reference values Uref(i=1 . . . M2);
- determining, from the plurality of first and second confined reference values Vcf(i=1 . . . M) and Ucf(i=1 . . . M2) a scaling deviation between the first and second group of repetitive three-dimensional structures.

Clause 28. The method according to clause 27, wherein the first row or column of repetitive three-dimensional structures is arranged perpendicular to the second row or column of group of repetitive three-dimensional structures.

Clause 29. A slice and imaging method to acquire 3D volume image of a deep inspection volume at a depth D within a semiconductor wafer, comprising the steps

- forming a first milled reference surface at a first angle GF1 adjacent to the deep inspection volume;
- obtaining a series of second cross-section image slices through the deep inspection volume at a second angle GF2>GF1, the series of a cross-section image slices intersecting the first milled reference surface;
- determining parameters of a plurality of HAR structures in the deep inspection volume.

Clause 30. The method according to clause 29, wherein the deep inspection volume comprises a transition from a first stack of HAR structures to a second stack of HAR structures; and at least one determined parameter is an overlay parameter at the interface between the first stack of HAR structures and the second stack of HAR structures.

Clause 31. The method according to clause 30, further comprising determining a first set of N cross-section values v1 . . . vN through the plurality of HAR channels in the first stack in a first reference plane adjacent to the interface, determining a second set N cross-section values u1 . . . uN through the plurality of HAR channels in the second stack in a second reference plane adjacent to the interface, computing a difference between the first set of cross-section values v1 . . . vN and the second set of cross-section values u1 . . . uN.

Clause 32. The method according to clause 31, wherein the determination of the first or second set of cross-section values v1 . . . vN and u1 . . . uN in the first or second reference planes is determined according to any of the method steps 1 to 26.

Clause 33. An inspection apparatus for wafer inspection, comprising a FIB column arranged and configured for milling a series of cross-sections surfaces at an inspection site into the surface of wafer;

a charged particle microscope arranged an configured for imaging the series of cross-sections surfaces;

a stage configured for holding and positioning the inspection site of a wafer;

a control unit configured for controlling the operation of milling and imaging the series of cross-section surfaces;

a computing unit configured for determining at least a first set of L parameters describing a first group of repetitive three-dimensional structures inside of an inspection volume of a semiconductor wafer according to any of the clauses 1 to 32.

Clause 34. A method of inspection of a group of repetitive three-dimensional structures in a wafer, comprising determining an inspection position of an inspection volume in the wafer, adjusting the wafer with the inspection position at the cross-section of a dual beam device, performing any of the method steps of clauses 1 to 32.

The disclosure described by examples and embodiments is however not limited to the clauses but can be implemented by those skilled in the art by various combinations or modifications.

A List of Reference Numbers is Provided

1 Dual Beam Device
2 Operation Control Unit
4 first cross-section image features
6 measurement sites
8 wafer
15 wafer support table
16 stage control unit
17 Secondary Electron detector
19 Control Unit
40 charged particle beam (CPB) imaging system
42 Optical Axis of imaging system
43 Intersection point
44 Imaging charged particle beam
48 Fib Optical Axis
50 FIB column
51 focused ion beam
52 cross-section surface
53 cross-section surface
55 wafer top surface
73 second cross-section image feature
77 cross-section image segments of HAR channels
78 vertical edge of a HAR structure
80 horizontal edge of a layer
155 wafer stage
160 inspection volume
301 cross-section surface
303 cross-section image slice
305 reference surface
307 measured cross-section image of HAR structure
309 HAR structures
311 cross-section image slice
313 word lines
315 edge with surface
317 inner circular ring
319 outer circular ring
321 center position
323 selected reference feature
325 defects or artefacts
327 depth zone
329 intersection point
331 initial reference values
341 relative center positions
343 average x-position of HAR centers
345 raster
347 rows or columns
351 deck of HAR structures
353 interface
361 Displacement distribution at depth level
363 average HAR channel trajectory
365 linear tilt component
367 sampling positions in z
369 parametric curve
371 virtual cross-section image slice
373 distribution of diameters of HAR features in a slanted cross-section image slice
375 distribution of diameters of HAR features in the virtual image slice
377 correction values

What is claimed is:

1. A method of determining a first set of parameters describing a first group of repetitive three-dimensional structures inside an inspection volume of a semiconductor wafer, the method comprising:

a) obtaining a series of cross-section image slices of the inspection volume of the semiconductor wafer, the series comprising a first cross-section image slice at a first angle through the inspection volume and a second cross-section image slice at a second angle through the inspection volume;

b) determining a first set of measured cross-section values of the first group of repetitive three-dimensional structures inside the inspection volume from the series of cross-section image slices at different positions within the inspection volume;

c) determining a plurality of initial reference values of the first group of repetitive three-dimensional structures within a first reference plane; and d) determining the first set of parameters by least square optimization of a first parameter model to the first set of measured cross-section values and the plurality of initial reference values.

2. The method of claim 1, further comprising adjusting a number and a spacing of the series of cross-section image slices and the first and/or second angles to determine, in each predetermined interval of z-position, at least two cross-section values of the first set of measured cross-section values.

3. The method of claim 1, wherein a) comprises:
determining a sequence of z-positions of the cross-section values to be measured; and
adjusting a number and a spacing of the series of cross-section image slices and the first and/or second angle according to the sequence of z-positions of the cross-section values.

4. The method of claim 3, wherein determining of the sequence of z-positions is based on a predetermined minimum sampling rate of z-positions for determining a first set of parameters of a first plurality of high aspect ratio structures.

5. The method of claim 3, further comprising determining predetermined sequence of z-positions or a predetermined sampling rate of z-positions and/or predetermined reference values from a 3D volume image of a representative inspection volume of a representative wafer obtained by slicing and imaging at least 10 cross-section image slices.

6. The method of claim 1, wherein c) comprises using predetermined reference values about a first plurality of high aspect ratio structures inside the inspection volume of the semiconductor wafer.

7. The method of claim 1, further comprising:
e) determining a plurality of first confined reference values in the first reference plane from the first set of parameters and the plurality of initial reference values; and
f) confining the first set of parameters by least square optimization of a first parameter model to the first set of measured cross-section values and the plurality of first confined reference values.

8. The method of claim 1, wherein the series of cross-section image slices comprises at least a third cross-section image slice at the second angle through the inspection volume, wherein the second angle is greater than the first angle.

9. The method of claim 1, further comprising scaling a measured cross-section value of the first set of measured cross-section values with a predetermined scaling parameter.

10. The method of claim 9, further comprising:
selecting the predetermined scaling parameter according to the angle of the cross-section image slice from which the measured cross-section value is obtained; or
selecting the predetermined scaling parameter according to the depth of the measured cross-section value.

11. The method of claim 1, wherein the first set of parameters describe at least one member selected from the group consisting of a tilt, a curvature, an oscillation frequency, an oscillation amplitude, and a power amplitude of an average three-dimensional structure of the first group of repetitive three-dimensional structures inside the inspection volume.

12. The method of claim 1, further comprising determining a second set of parameters describing a second group of repetitive three-dimensional structures by a method comprising:
b2) determining a second set of measured cross-section values of the second group of repetitive three-dimensional structures from the series of cross-section image slices at different z-positions within the inspection volume;
c2) determining a plurality of second initial reference values of the second group of repetitive three-dimensional structures within a second reference plane; and
d2) determining the second set of parameters by least square optimization of a second parameter model to the second set of measured cross-section values and the plurality of initial reference values.

13. The method of claim 12, further comprising:
e2) determining a plurality of second confined reference values in the second reference plane from the second set of parameters and the plurality of initial reference values; and
f2) confining the second set of parameters by least square optimization of a second parameter model to the second set of measured cross-section values and the plurality of confined reference values.

14. The method of claim 12, further comprising:
determining a plurality of cross-section image features of a plurality three-dimensional structures in the series of cross-section image slices; and
grouping the plurality of cross-section image features in first cross-section image features of the first group of repetitive three-dimensional structures and second cross-section image features of the second group of repetitive three-dimensional structures.

15. The method of claim 14, wherein the repetitive three-dimensional structures are high aspect ratio (HAR) structures of a memory device, forming a first plurality of HAR structures and a second plurality of HAR structures.

16. The method of claim 15, wherein:
the first plurality of HAR structures corresponds to a first stack of HAR structures;
the second plurality of HAR structures corresponds to a second stack of HAR structures underneath the first stack;
the grouping is performed according to a depth of a cross-section image feature.

17. The method of claim 14, wherein:
the first group of repetitive three-dimensional structures corresponds to a first row or column of repetitive three-dimensional structures;
the second group of repetitive three-dimensional structures corresponds to a second row or column of repetitive three-dimensional structures; and
the grouping is performed according to a lateral position of a cross-section image feature.

18. The method of claim 17, further comprising:
determining a plurality of first confined reference values in the first reference plane from the first set of parameters and the plurality of initial reference values;
determining a plurality of second confined reference values in the second reference plane from the second set of parameters and the plurality of initial reference values; and
determining, from the plurality of first and second confined reference values and a scaling deviation between the first and second group of repetitive three-dimensional structures.

19. One or more machine-readable hardware storage devices comprising instructions that are executable by one or more processing devices to perform operations comprising the method of claim 1.

20. A system, comprising:
a focused ion beam column;
a charged particle microscope;
one or more processing devices; and one or more machine-readable hardware storage devices comprising instructions that are executable by the one or more processing devices to perform operations comprising the method of claim 1.

* * * * *